US012460462B2

(12) United States Patent
Carullo et al.

(10) Patent No.: US 12,460,462 B2
(45) Date of Patent: Nov. 4, 2025

(54) SECURE VAULT APPARATUS

(71) Applicant: Ellenby Technologies, Inc., Woodbury Heights, NJ (US)

(72) Inventors: Thomas J. Carullo, Sewell, NJ (US); Aaron H. Dobbins, Cherry Hill, NJ (US)

(73) Assignee: ELLENBY TECHNOLOGIES, INC., Woodbury Heights, NJ (US)

(*) Notice: Subject to any disclaimer, the term of this patent is extended or adjusted under 35 U.S.C. 154(b) by 245 days.

(21) Appl. No.: 18/170,175

(22) Filed: Feb. 16, 2023

(65) Prior Publication Data

US 2024/0279972 A1 Aug. 22, 2024

(51) Int. Cl.

| | |
|---|---|
| ***E05D 7/14*** | (2006.01) |
| ***E05D 3/02*** | (2006.01) |
| ***E05D 11/00*** | (2006.01) |
| ***E05G 1/026*** | (2006.01) |

(52) U.S. Cl.

CPC ................. *E05D 7/14* (2013.01); *E05D 3/02* (2013.01); *E05D 11/0054* (2013.01); *E05G 1/026* (2013.01); *E05Y 2201/11* (2013.01); *E05Y 2201/682* (2013.01); *E05Y 2999/00* (2024.05)

(58) Field of Classification Search

CPC ......... E05D 7/14; E05D 3/02; E05D 11/0054; E05D 11/0018; E05G 1/026; E05Y 2999/00; E05Y 2201/11; E05Y 2201/682

USPC ........................................................... 109/53

See application file for complete search history.

(56) References Cited

U.S. PATENT DOCUMENTS

| | | | | |
|---|---|---|---|---|
| 4,539,828 | A | 9/1985 | Teleky | |
| 5,666,695 | A | 9/1997 | Jegers et al. | |
| 5,931,104 | A | 8/1999 | Horn et al. | |
| 6,971,322 | B2 | 12/2005 | DuBois et al. | |
| 7,350,470 | B1 * | 4/2008 | Stuhlbarg | E05D 7/14 109/74 |
| 7,779,983 | B2 | 8/2010 | Dobbins | |
| 9,732,549 | B2 | 8/2017 | Chow | |
| 9,915,084 | B1 | 3/2018 | Smith et al. | |
| 10,119,322 | B2 | 11/2018 | Carullo et al. | |
| 10,584,515 | B2 | 3/2020 | Dobbins et al. | |
| 11,193,310 | B2 | 12/2021 | Dobbins et al. | |
| 2016/0110939 | A1 * | 4/2016 | Dobbins | E05B 47/0696 70/263 |
| 2019/0218839 | A1 * | 7/2019 | Glogovsky | E05D 7/14 |

FOREIGN PATENT DOCUMENTS

| | | | | |
|---|---|---|---|---|
| DE | 202014102793 U1 * | 8/2014 | | E05D 11/0054 |
| EP | 2184429 A1 * | 5/2010 | | E05D 11/0081 |

OTHER PUBLICATIONS

Engineering Clicks, "How A Safe Is Designed (Part 1 Ingenious Engineering Against Attack)", Oct. 7, 2017, K.I.S.S., https://www.engineeringclicks.com/how-a-safe-is-designed/.

* cited by examiner

*Primary Examiner* — Suzanne L Barrett

(74) *Attorney, Agent, or Firm* — McCarter & English, LLP

(57) ABSTRACT

A secure and cost-effective smart safe or secure vault apparatus construction is provided. The smart safe includes a high security hinge designed to protect against intrusion by pocketing the hinge behind the doors and securing the hinge dowel to plates affixed to the doors. The door construction features an envelope passageway door and slide-out user interface cluster with primary and secondary customer-facing user interfaces.

20 Claims, 25 Drawing Sheets

SECURE VAULT APPARATUS

TECHNICAL FIELD

The present disclosure relates to an improved construction of secure vaults and/or safes used to safeguard valuables inclusive of cash, coin, inventory, or the like, and particularly relates to an improved hinge design for secure vaults and/or safes.

BACKGROUND

Safes and vaults have been used throughout history to safeguard valuables from theft. In general, the portion of a safe that has the greatest exposure to attack by those seeking to gain unauthorized access are the doors. Safe doors are necessarily the most convenient targets as they must be easily accessible to the operator and are designed to fully open given proper authentication.

It is well established that safe doors can be fortified with materials that are resistant to cutting, torching, grinding, prying, and sledgehammering using thick steel sheets, or thinner steel sheets reinforced using layers of hardened metals, carbide inclusions, concrete, or a blend of those with other materials. Doors of this construction are necessarily thick, heavy, and expensive to be formidable to break-ins.

Existing safes are constructed using a variety of door hinging techniques. One particularly popular method is the use of a plurality of external hinges, such as illustrated in the existing safe 100 of FIG. 1. In this hinge style, knuckles 110*a*-110*f* are mounted to the door and mating side knuckles 111*a*-111*f* are mounted to the body of the safe. A short dowel pin seats between each mating pair of knuckles (e.g., a dowel pin for knuckles 110*a*, 111*a*, a separate dowel pin for knuckles 110*b*, 111*b*, and so on) forming an axis for the doors to swing.

Door hinges placed external to a safe (as in the configuration of FIG. 1) are often subjected to attacks since in many safe designs, hinges are plainly visible in front of the door and capable of easily being cut or chiseled off the door of the safe. Hooking structures on the hinge side of the safe door is a common method of preventing the removal of the door if the hinges are removed. These hooks wrap around a door jamb of the hinge-side wall of the safe. Alternatively, some bolt work within the safe door may be arranged to extend bolts on both hinge side and the non-hinge side walls of the safe to retain the door even in the absence of the hinges themselves. These additional protective measures may complicate the overall manufacturing costs of the safe, thereby increasing the overall costs of manufacturing.

Alternative hinge technology, such as that shown in the safe 200 of FIG. 2 (described in U.S. Pat. No. 10,119,322 and incorporated herein by reference in its entirety), forms the steel from the door material itself to make the door side knuckles (210*a*, 210*b*, and 210*c*) and forms the steel from the body of the safe into mating knuckles 211. The door and body-side knuckles are coupled with one long rod that extends the length of the safe body. This technology offers a securely protected hinge mechanism without the use of other hooking door retention features or specially designed welded on external hinge components. The drawback however is the steel used to form the hinge is typically limited to thinner gauges that can be formed into a tight radius, and the forming process needs to be precisely controlled for proper construction.

Smart safes, such as the example of FIG. 2, have the task of both securing valuables and accepting operator inputs through interface 220. With the interface 220, operators provide credentials for opening door locks, accessing safe information, or for manipulating other electromechanical hardware such as banknote validators 230, 231 or opening envelope drop passageway 240. Interfaces like the one shown in FIG. 2 preferably are highly robust for a retail environment where they are subjected to spills, excessive pressure from operators using pens instead of fingers for pressing buttons, and unintentional impacts. It is desirable to have richer touchscreen interfaces, but such interfaces are more damage prone. In general, they also suffer the drawback of working best with common feature-rich operating systems that require large amounts of data to update and keep secure against cyber-attack and hacking.

There is a need for a cost-effective safe construction that prevents easy access for defeating a safe hinge, secures the door to the safe body even in the event the safe hinge is removed, and fortifies the door against attack. There is also a need for a more robust user interface that will not compromise the safe function even when damaged, hacked, or malfunctioning.

SUMMARY

In accordance with embodiments of the present disclosure, an exemplary cost-effective high security safe (e.g., secure vault) apparatus is described inclusive of a pocketed hinge located external to the secured interior volume of the safe. The pocket is formed at the junction of the door(s) in the front of the safe and the hinge-side wall of the safe that is formed inward just behind the door(s).

In some embodiments, the doors of the safe can be reinforced with a series of perpendicularly affixed plates running widthwise across the doors that add stiffness to the door, provide a coupling means between the door and the hinge, and include hook features that wrap around the pocket.

The external hinge includes of a rod that runs the height of the safe enclosure which passes through at least some of the previously mentioned hinge coupling perpendicularly affixed plates along with one or more knuckles attached to the hinge-side wall of the safe. The plane of the doors lies in front of the hinge rod such that the rod is hidden from view by the doors when viewed from in front of the safe. Use of a single hinge rod for a safe having multiple doors advantageously aligns the doors to each other along the common hinge rod axis.

The hinge rod is further characterized by having a tapped hole in its central axis positioned facing the floor of the safe. The hole can be tapped and is capable of being fit to a bolt for ease of removal from the safe through an opening in the floor of the safe. A sliding base plate mounted to the interior of the safe body is used to block access to the tapped hole of the hinge rod once the hinge rod is fully installed in the safe.

A formed steel cover piece is affixed to each safe door to bend around the hinge rod. The cover piece covers the gap between the hinge rod and the safe wall on the side of the safe, thereby preventing crowbars or other prying devices from gaining leverage to separate the door from the safe. The cover also presents a more aesthetically pleasing side profile by hiding the hinge rod when viewed from the hinge-side wall of the safe.

In some embodiments, the doors of the safe can be reinforced with hardened steel dowel rods that are trapped by perpendicularly affixed plates and other hardware mounted to the inner surface of the door during safe assembly. The rods are configured to freely spin when in contact with a spinning cutting wheel or reciprocating saw. The rods are also positioned at least to span across the length of the extended bolts in the door's bolt work and preferably located in the space above the bolts. These rods provide an additional safety feature against attempted intrusion into the safe using a cutting wheel or reciprocating saw.

In some embodiments, mounted on the doors of the safe are bolt work features that engage with the non-hinge side wall of the safe. Such bolt work is characterized by having automatic re-lockers which automatically extend the bolts into the locked position when the door is closed.

In some embodiments, mounted on the doors may be slidable shutters that are configured to either pass or block the passage of small items into the safe's interior space. Items such as envelopes, banknotes, or other items of value can be passed into the safe through the passageway revealed when the shutter is slid into an open position. When slid into the closed and locked position, the sliding shutter blocks the passageway in the door. The presence of a lockable passageway in the door allows for controlled access of small items to be passed into the safe without needing to open the door exposing valuables to theft. The slidable shutter mechanism can remain in the extended, closed position while the door is opened.

A user interface module can be mounted on top of the safe and includes a touchscreen smart device as a primary interface, in addition to a keypad display secondary interface and a thermal printer. The interface module is configured to slide forward on slides to expose the secondary interface when needed as a backup to the primary interface.

In accordance with embodiments of the present disclosure, an exemplary safe is provided. The safe illustrated demonstrates electronic validation and storage of banknotes with a keypad user interface, a safe controller, electronic door locks and integrated power supply, together, typically known as a smart safe. The safe includes an upper compartment designed primarily for the servicing of electronics and bill validator and characterized by a service door. The safe includes a lower compartment disposed beneath the upper compartment and contains a cassette of orderly stacked notes delivered from the bill validator as well as any deposited small items through the controlled passageway through the door. However, other configurations of the upper and lower compartments (as well as intermediate/middle compartments) is envisioned.

Safe construction discussed in this disclosure will be given in the context of a representative bill validating smart safe. It should be understood that inventions disclosed can be applied to broader safe varieties including those without bill validators and with other configurations of doors.

In accordance with embodiments of the present disclosure, an exemplary secure vault apparatus is provided. The secure vault apparatus includes an enclosure formed by a rear wall, a first side wall, and a second side wall. The secure vault apparatus includes a hinge pin disposed outside of the enclosure, and at least one door movably coupled to the enclosure by the hinge pin. The at least one door defines a height and defines a front surface of the secure vault apparatus. The hinge pin is covered entirely by the at least one door along the height of the at least one door at the front surface of the secure vault apparatus.

The first side wall can define a first plane extending along an outer surface of the first side wall, and the second side wall can define a second plane extending along an outer surface the second side wall. The hinge pin is disposed entirely between the first and second planes of the first and second side walls. In particular, the hinge pin is disposed entirely between the first plane, the second plane, and an inner surface of the at least one door.

The first and second side walls can each include a distal edge connected to the rear wall and each include a proximal edge defining an opening extending into the enclosure. The proximal edge of the second side wall includes a hinge pocket formed therein. The hinge pocket defines a space disposed entirely outside of the enclosure and configured to receive the hinge pin. The hinge pocket includes a first wall extending inwardly towards the first side wall, and a second wall extending perpendicularly from the first wall and parallel to an outer surface of the second side wall. The hinge pocket includes capture knuckles extending from the second wall Each capture knuckle includes an opening configured to receive the hinge pin at least partially therethrough.

The at least one door includes a top edge, a bottom edge, a first side edge, and a second side edge. The at least one door includes a first flange extending perpendicularly at or near the top edge and a second flange extending perpendicularly at or near the bottom edge. The first and second flange each include an opening formed therein at or near the second side edge of the at least one door. The opening is configured to at least partially receive the hinge pin therethrough. The first and second flange each include a retaining hook formed therein at or near the second side edge of the at least one door. The retaining hook defines a curved slot complementary to a wall of the hinge pocket. The curved slot is configured to receive the hinge pocket therein when the at least one door is in a closed position relative to the enclosure.

The at least one door can include a curved cover extending from the second side edge between the first and second flanges. The curved cover can define a semicircular wall configured to at least partially surround the hinge pin and prevent exposure of the hinge pin outside of the enclosure.

In accordance with embodiments of the present disclosure, an exemplary secure vault apparatus is provided. The secure vault apparatus includes an enclosure formed by a rear wall, a first side wall, and a second side wall, and a hinge pin disposed outside of the enclosure. The secure vault apparatus includes a first door movably coupled to the enclosure by the hinge pin. The first door defines a first door height and defines a front surface of the secure vault apparatus. The secure vault apparatus includes a second door movably coupled to the enclosure by the hinge pin. The second door defines a second door height and also defines the front surface of the secure vault apparatus. The hinge pin is covered entirely by the first door along the first door height and is covered entirely by the second door along the second door height at the front surface of the secure vault apparatus. The hinge pin supports both the first door and the second door, and extends at least a combined height defined by the first door height and the second door height.

In accordance with embodiments of the present disclosure, an exemplary method of secure vault apparatus operation is provided. The method includes positioning at least one door of a secure vault apparatus between an open position and a closed position to expose and cover an enclosure of the secure vault apparatus. The enclosure is formed by a rear wall, a first side wall, and a second side wall of the secure vault apparatus. The secure vault apparatus includes a hinge pin disposed outside of the enclosure and at least one door movably coupled to the enclosure by the hinge pin. The at least one door defines a height and defines a front surface of the secure vault apparatus. The hinge pin is covered entirely by the at least one door along the height of the at least one door at the front surface of the secure vault apparatus.

The first and second side walls each include a distal edge connected to the rear wall and each include a proximal edge defining an opening extending into the enclosure. The proximal edge of the second side wall includes a hinge pocket formed therein. The hinge pocket defines a space disposed entirely outside of the enclosure and configured to receive the hinge pin.

The at least one door includes a top edge, a bottom edge, a first side edge, and a second side edge. The at least one door includes a first flange extending perpendicularly at or near the top edge and a second flange extending perpendicularly at or near the bottom edge. The first and second flange each include a retaining hook formed therein at or near the second side edge of the at least one door. The retaining hook defines a curved slot complementary to a wall of the hinge pocket. The curved slot is configured to receive the hinge pocket therein when the at least one door is in the closed position relative to the enclosure.

In accordance with embodiments of the present disclosure, an exemplary configuration of a user interface for a secure vault apparatus with a first robust and secure keypad interface, a second touchscreen user interface, and a printer is provided. The second user interface is positioned at the top of the secure vault apparatus, directly in view of the operator and configurable to control aspects of the secure safe apparatus and electronic devices within. The first interface is accessible with slide out mechanism. Where the first interface is fully operatable to communicate with a safe controller to control the primary features of the secure vault apparatus including user authentication, door access, and control of any electronic payment interfaces, even in the event that the second interface is damaged, removed, or malfunctioning. Data and control signals exchange between the first interface and the safe controller located within the enclosure of the secure vault apparatus. The second interface communicates with the first interface to exchange data and control signals with the safe controller.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the secure vault apparatus, reference is made to the accompanying figures, wherein.

DETAILED DESCRIPTION

Figure 1:
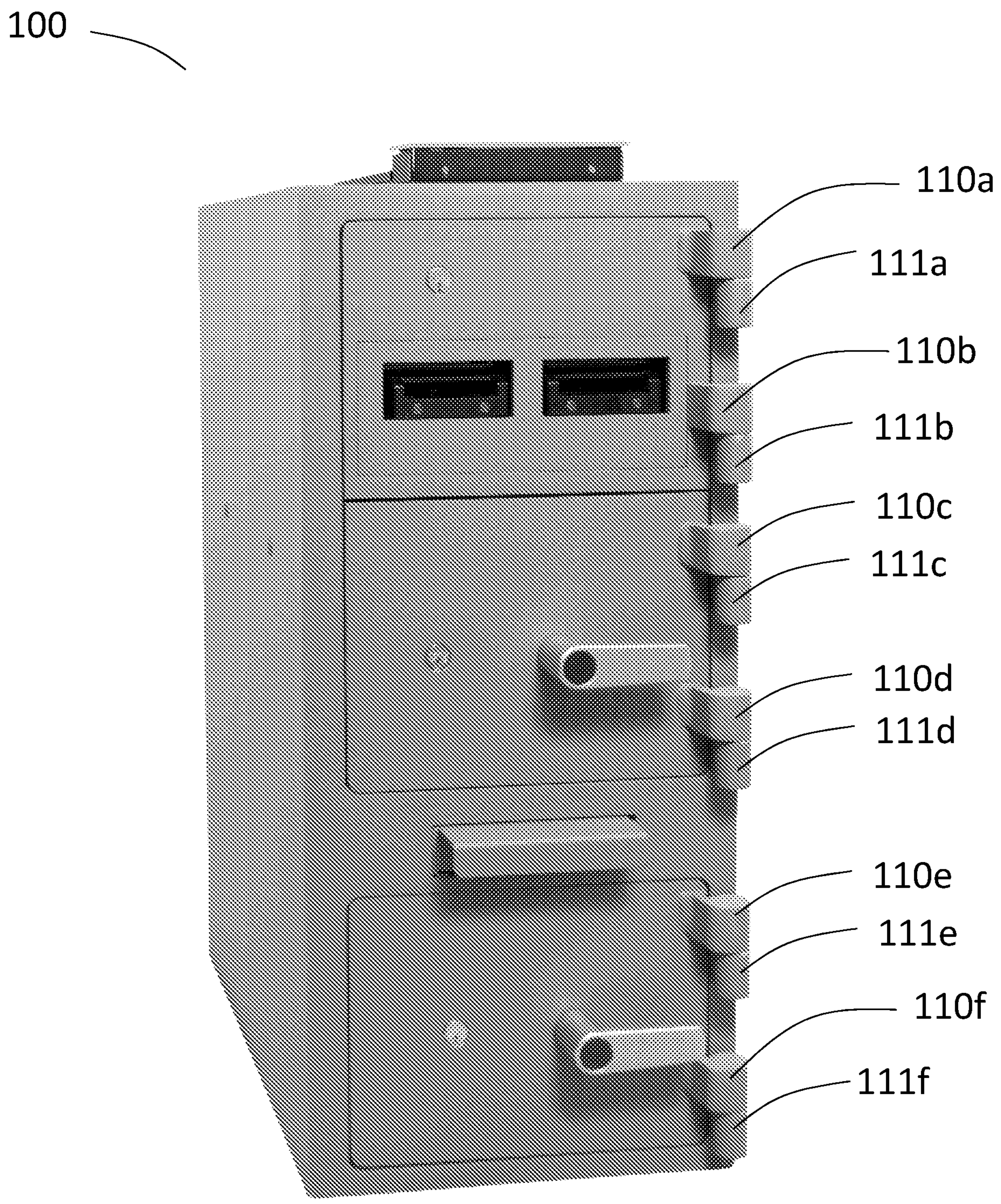
FIG. 1 (PRIOR ART)
FIG. 1 shows a perspective view of an existing smart safe constructed with external hinges.
Figure 2:
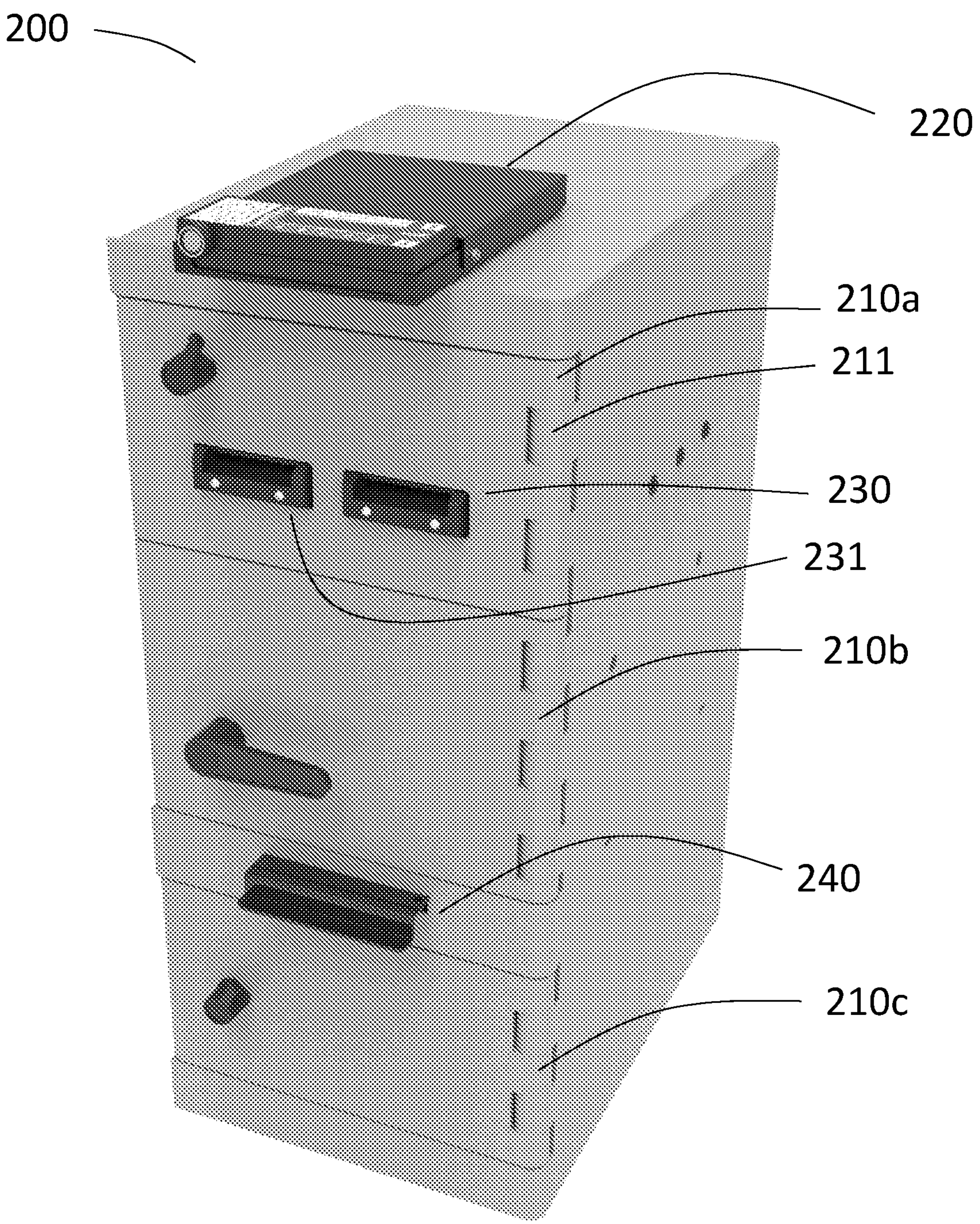
FIG. 2 (PRIOR ART)
FIG. 2 shows a perspective view of an existing smart safe with an integrated hinge design.
Figure 3:
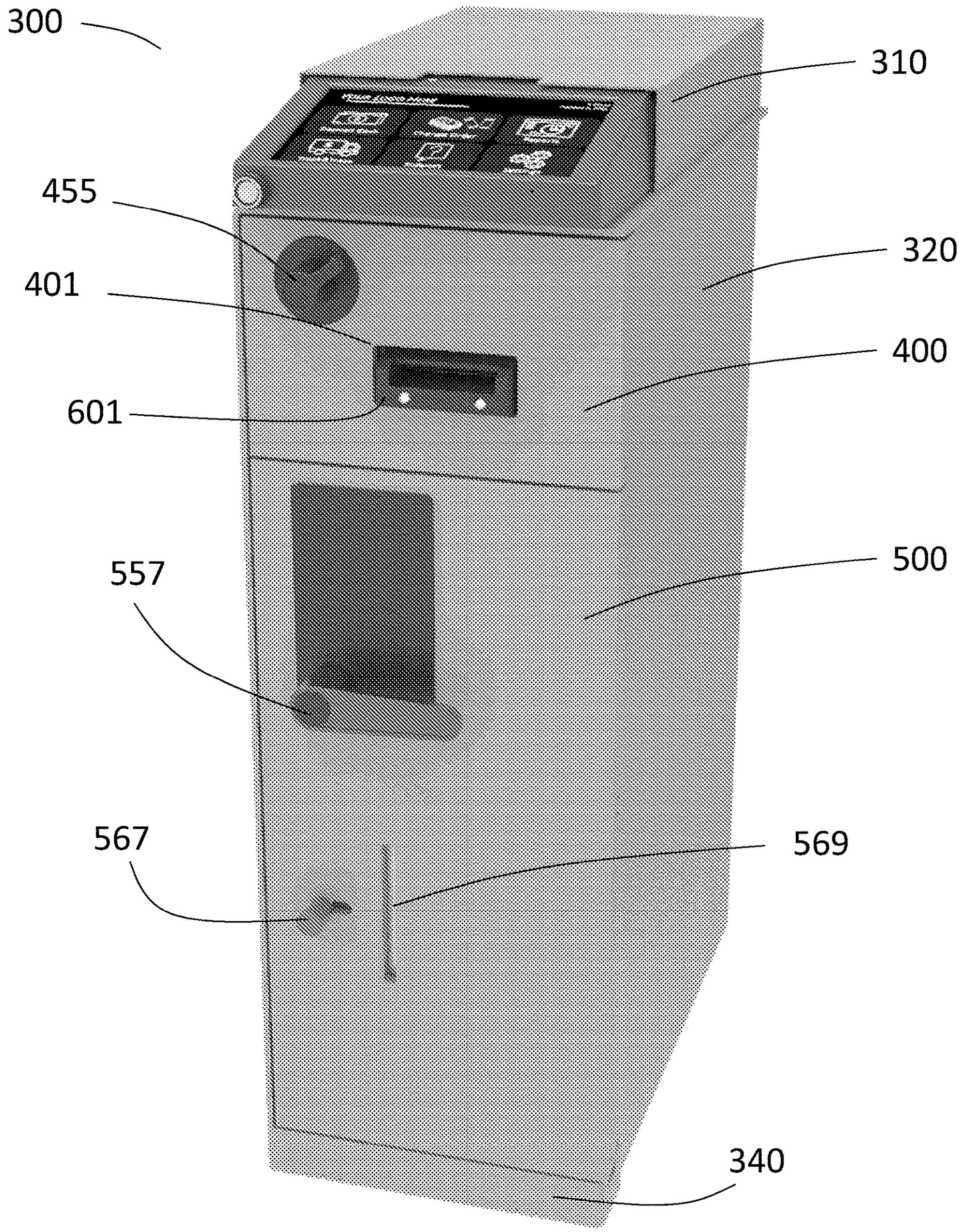
FIG. 3 shows a perspective view of an exemplary secure vault apparatus in accordance with the present disclosure.

A safe 300 (e.g., a secure vault apparatus) representative of the present invention is shown in FIG. 3. The safe is characterized by having user interface enclosure 310 on the top where operators can interact with the safe 300 across a range of activities, including accessing compartments of the safe 300, modifying configurations and permissions, declaring deposits into the safe 300, removal of valuables from the safe 300, or the like.

A top door 400 safeguards a first interior space or enclosure (e.g., a service area) of the safe 300. The door 400 is accessed by turning handle 455 and pulling outward once the door 400 is unlocked. Behind door 400 is bill acceptor head 602 (see FIG. 11) whose entry path 601 is accessible through door opening 401 for the purpose of depositing banknotes.

A lower door 500 safeguards a second interior space or enclosure (e.g., a valuables area) of the safe 300. The door 500 is accessed by turning handle 557 and pulling outward once the door 500 is unlocked. Behind door 500 is cashbox 603 (see FIG. 11) configured to receive banknotes validated by bill acceptor head 602. The lower door 500 also includes a slot 569 protected by a sliding door mechanism (discussed below). Envelopes and other valuables can be inserted into slot 569 when the sliding door mechanism is slid to the open position by pulling knob 567 to the right once unlocked through the user interface.

Both doors 400, 500 are pivotably connected to the safe 300 by a hinge. Although the safe 300 is shown with two doors 400, 500, it should be understood that the safe 300 could include a single door, or two or more doors. Just behind the right-side edge of doors 400, 500 is the door hinge which is embedded in a pocket formed at the front edge of right-side safe wall 320. The hinge is blocked from view when looking at the safe from the front by the doors 400, 500 and by base plate 340. In particular, as discussed in greater detail below, the hinge is oriented vertically to support both doors 400, 500, while being disposed within the planes defined by the front surface of the doors 400, 500, the right side safe wall 320, and the opposing left side safe wall. Further, the hinge is disposed within the planes defined by the rear surface/inwardly facing surface of the doors 400, 500, the right side safe wall 320, and the opposing left side safe wall.

Figure 4:
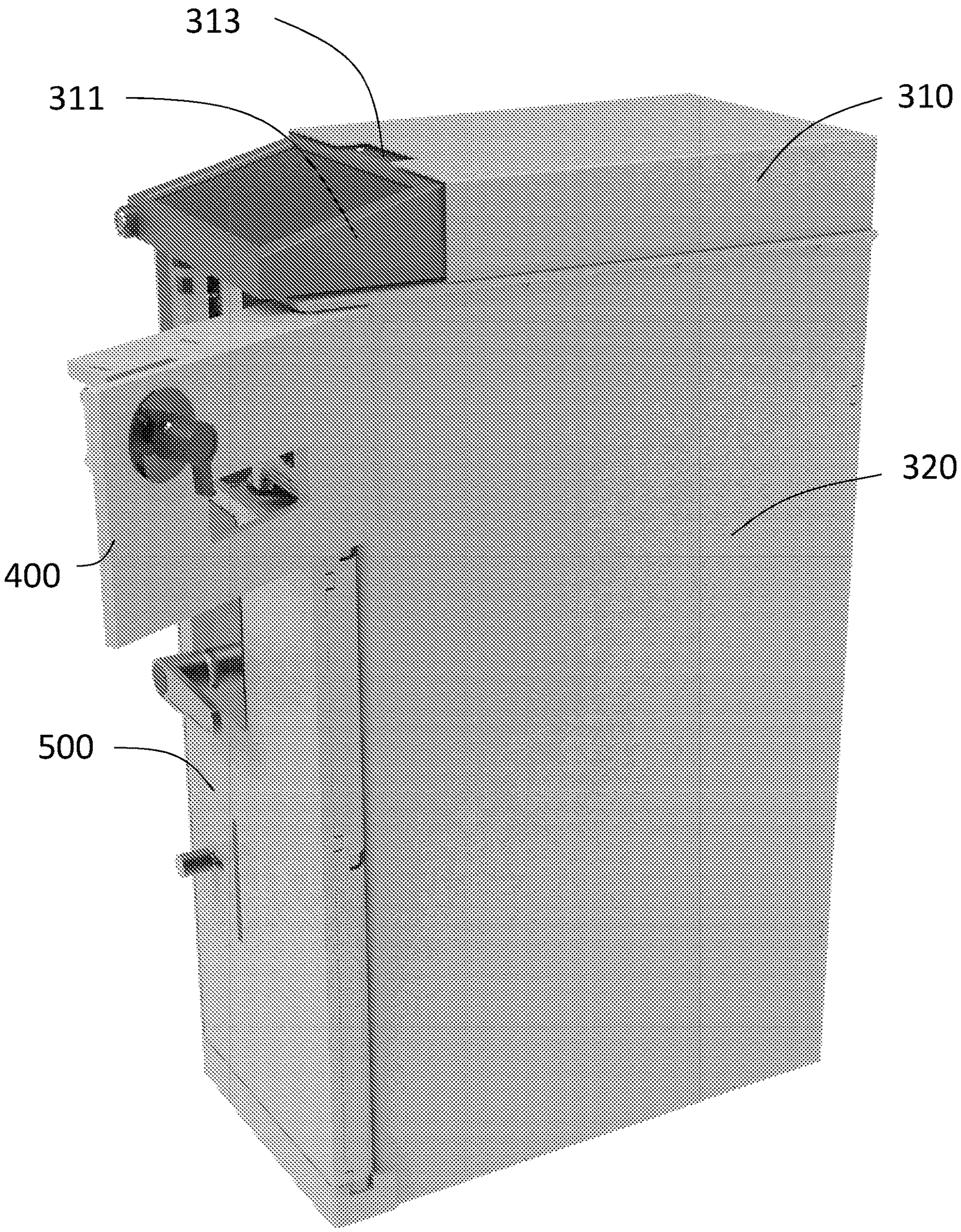
FIG. 4 shows a hinge-side perspective view of the exemplary secure vault apparatus of FIG. 3.

FIG. 4 shows a view of safe 300 from the right-side perspective with top door 400 opened. The door hinge is located at the front of right-side wall 320 just behind doors 400 and 500. Within the user interface enclosure 310, a slide-out interface module 311 is shown. A reveal 313 in interface enclosure 310 exposes a thermal printer printout slot allowing operators to receive receipt tickets for various activities performed.

Figure 5:
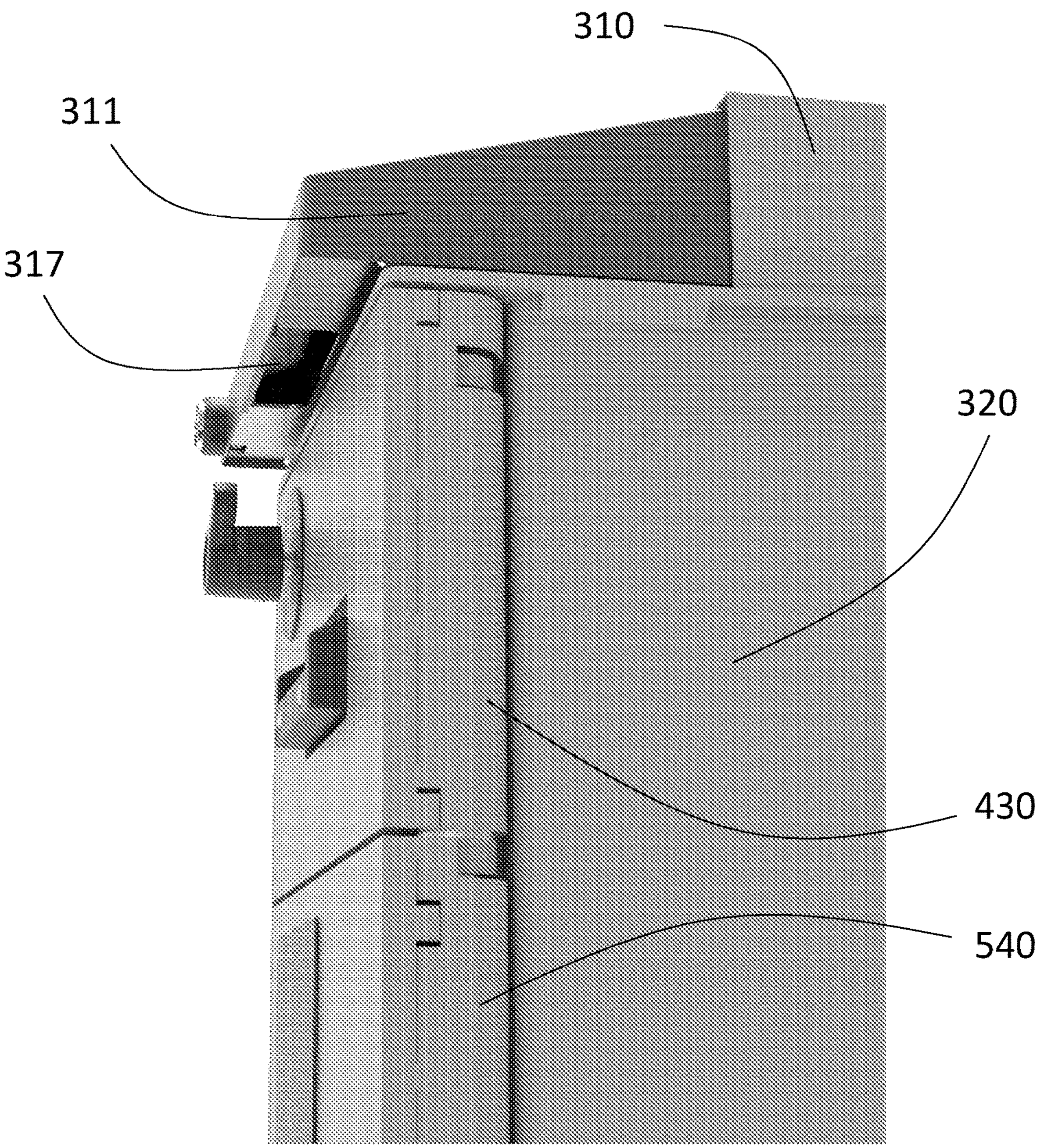
FIG. 5 shows a hinge-side up-facing view of the exemplary secure vault apparatus of FIG. 3.

Interface module 311 can be selectively slid-out of its enclosure 310 by an operator pulling handle 317 (FIG. 5) away from the safe 300. Handle 317 is built into the interface module 311 and located just under the front center ledge. From the upward facing right-side perspective view of FIG. 5, the hinge rod is blocked from view by hinge covers 430 and 540 affixed to the upper and lower doors 400 and 500, respectively. As discussed below, the right-side wall 320 bends inward to create a pocket for the hinge rod. (see, e.g., FIGS. 7A-7C).

Figure 6:
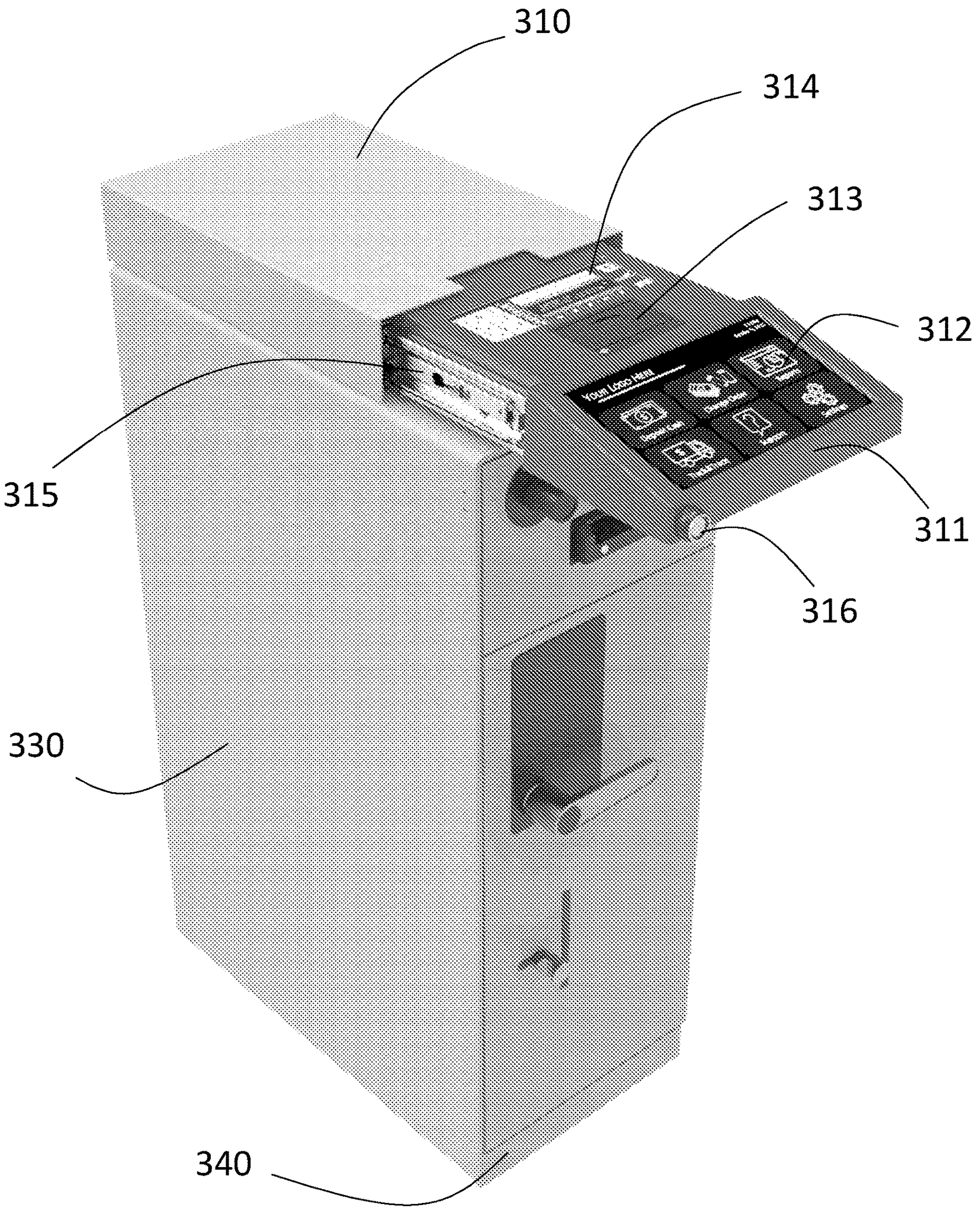
FIG. 6 shows a right side downward view of the exemplary secure vault apparatus of FIG. 3 including a user interface in an extended position.

FIG. 6 shows safe 300 with interface module 311 slid-out of enclosure 310 on rails 315 located on either side of the interface module 311. When extended outward, the operator can access a thermal printer 313, preferably a low-profile panel mounted variety with top facing paper loading door. Upon sliding out the interface module 311, a second interface 314 is exposed. The interface module 311 slides out for changing paper of the thermal printer and for accessing secondary interface 314. Primary user interface 312 and a Maxim Integrated Products' iButton® reader 316 and receipt printouts are accessible from the retracted or extended position of interface module 311. Primary interface 312 can be an 8" tablet running either an Android or iOS operating system.

The safe 300 therefore includes one user interface 312 that is permanently exposed and visible to the user, and a second user interface 314 that is only exposed and usable upon sliding out of the user interface 314 from the enclosure 310. Such arrangement can allow the user interface 312 to be primarily used for operation of the safe 300, with the second user interface 314 available for operations not available through the user interface 312 and/or as a back-up interface for operation of the safe 300. For example, if the user interface 312 is damaged, the enclosure 310 and the added robustness of second user interface 314, prevents damage to the user interface 314 and allows for continued operation of the safe 300. In some embodiments, the operational capabilities for controlling the safe 300 at the user interfaces 312, 314 can be substantially equal. In some embodiments, the operational capabilities for controlling the safe 300 at the user interfaces 312, 314 can be different. In some embodiments, the interfaces 312, 314 can communicate with each other for validation of the user and to permit operation of the safe 300.

Figure 7B:
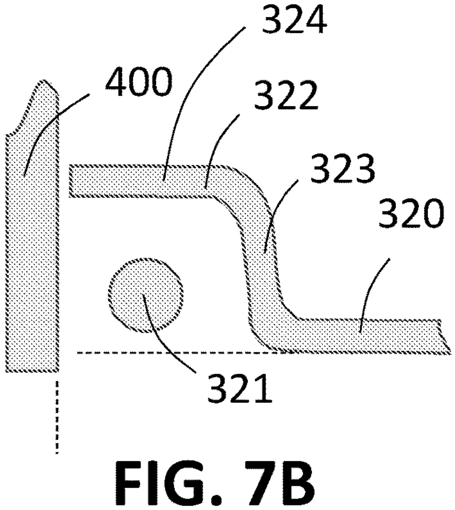
FIGS. 7A, 7B, and 7C illustrate a hinge mechanism of the exemplary secure vault apparatus of FIG. 3 with a perspective exterior view of the secure vault apparatus with hinge covers removed (FIG. 7A), and cross-sectional views of the hinge arrangement (FIGS. 7B-7C).
Figure 7C:
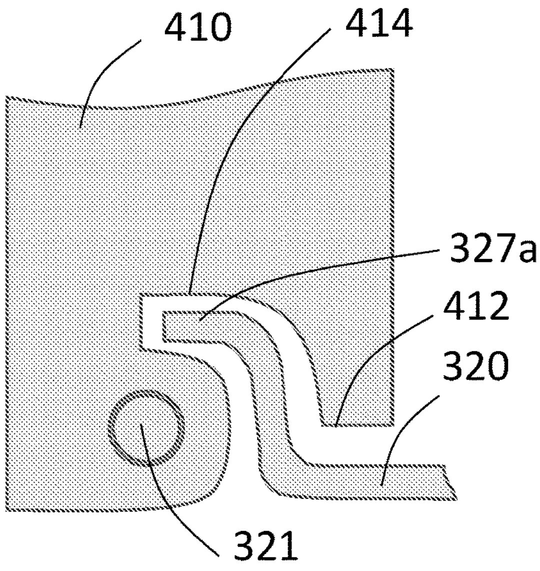
Figure 7A:
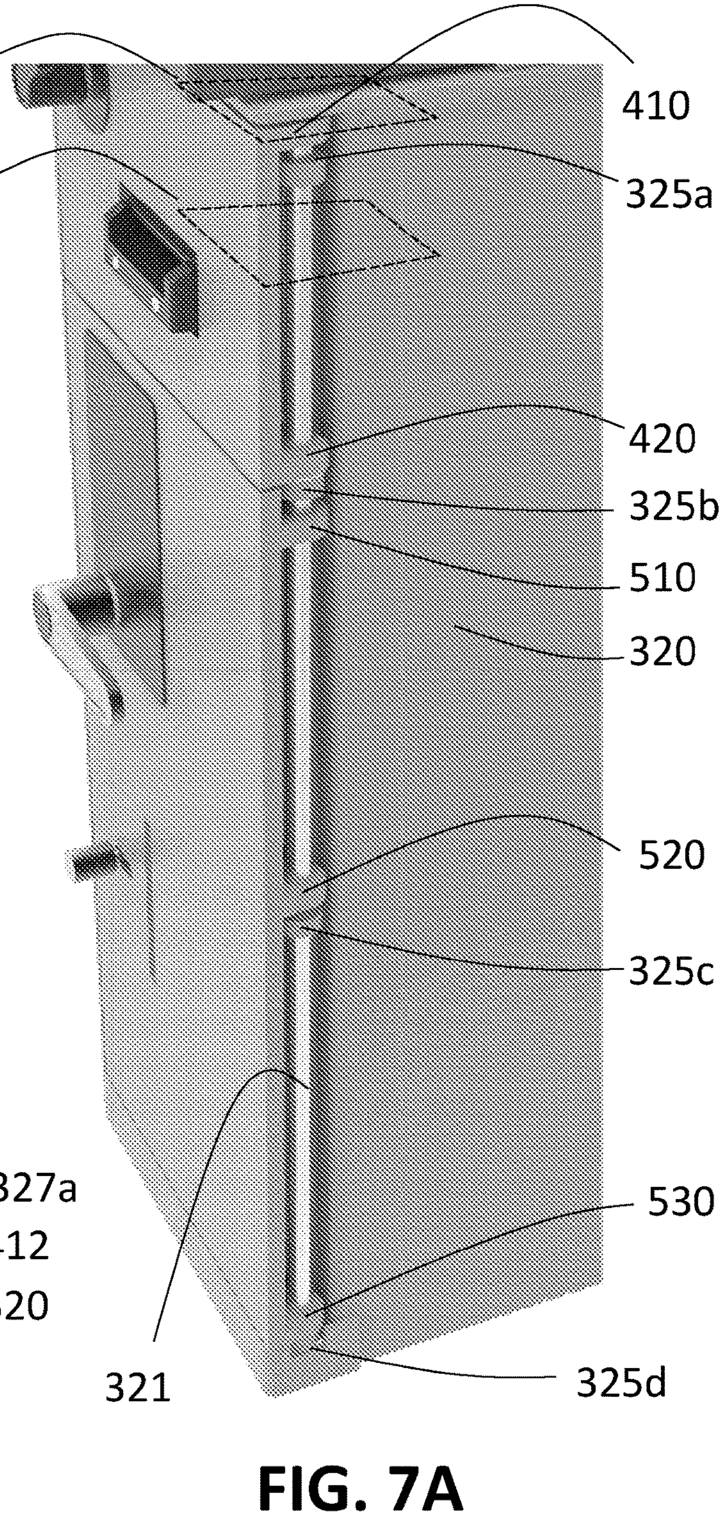

Returning to the right-side view of the safe in FIG. 7A, the hinge construction can be better understood by removing hinge covers 430 and 540 (FIG. 5) to expose the hinge rod 321 (e.g., hinge pin). Hinge rod 321 is in the pocket formed by a bend 322 in the proximal edge of the safe right-side wall 320 and the doors. Hinge rod 321 can be made of stainless steel and can have a diameter of about ½". For additional clarity, FIG. 7B shows a cross sectional diagram of the hinge pocket local to the top door. The cross section of FIG. 7C shows a closeup view of the hook retention feature that is integral to top plate 410 mounted to door 400 that wraps around the side-wall bend 322 at location **327*a* (FIG. 12) where the bent wall recesses back a bit to allow room for the door-side knuckle which is also integral to top plate 410** and will be discussed in greater detail later.

Still with reference to FIGS. 7A-7C, the inner walls of the safe 300, along with the inner walls of the doors 400, 500, form respective enclosures or inner spaces of the safe 300. The hinge rod 321 is disposed entirely outside of the enclosures disposed behind the doors 400, 500. This is achieved by the hinge pocket formed by the bend 322 in the wall 320. The proximal edge of the wall 320 includes a first wall 323 extending inwardly in a perpendicular orientation relative to the wall 322, and further includes a second wall 324 extending towards the door 400 and perpendicularly relative to the first wall 323 (and parallel to the wall 320). (see, e.g., FIG. 7B). The walls 323, 324 define a vertical space or pocket that extends at least the height of the combined doors 400, 500 and forms a space into which the hinge rod 321 can be positioned. The enclosure of the safe 300 associated with the door 400 is located on the opposite side of wall 324, and therefore ensures the hinge rod 321 is disposed entirely outside of the enclosure areas of the safe 300. The hinge rod 321 also remains positioned within the confines of the planes defined by the wall 320 and the inner wall of door 400, as shown in dashed lines in FIG. 7B.

As illustrated in FIG. 7C, each door 400, 500 includes at least one plate 410 (e.g., flange) extending perpendicularly at or near the top or bottom edge. For example, each door 400, 500 can include a plate 410 at or near the top edge and at or near the bottom edge. In some embodiments, the door 400 can include a plate 410 at or near the top edge and the door 500 can include a plate 410 at or near the bottom edge, such that the safe 300 only includes two such plates 410. Each plate 410 includes a curved slot or opening 414 extending from the side surface and curving towards the front surface of the respective door 400, 500. The edge of the curved slot 414 at the side surface forms a retaining hook-like feature 412. The slot 414 is configured substantially complementary to the walls 323, 324 of the hinge pocket such that the walls 323, 324 are at least partially received within the slot 414 when the door 400, 500 is in the closed position. When the respective door 400, 500 is pivoted into the open position, the walls 323, 324 are at least partially or fully disposed outside of the slot 414. The engagement or complementary positioning of the walls 323, 324 within the slot 414 when the doors 400, 500 are in the closed position provides an additional security feature for maintaining the position of the doors 400, 500.

Hinge rod 321 is captured by knuckles 325*a*, 325*b*, 325*c*, and 325*d* affixed to the right-side safe wall 320 and disposed within the space defined by the hinge pocket. The knuckles can be formed with the wall 320 as a unitary structure, or can be separately formed and welded to one or both of the walls 323, 324. Note that any number of knuckles can be used to secure the hinge rod 321 to the safe 300, but should be preferably two or more. Each door 400, 500 captures hinge rod 321 with knuckles integral to plates affixed to their respective doors 400, 500. For top door 400, door knuckles from plates 410 and 420 are shown. For bottom door 500, door knuckles from plates 510, 520, and 530 are shown. Note that any number of knuckles can be used to secure the doors 400, 500 to the hinge rod 321 but should be preferably two or more.

Figure 8:
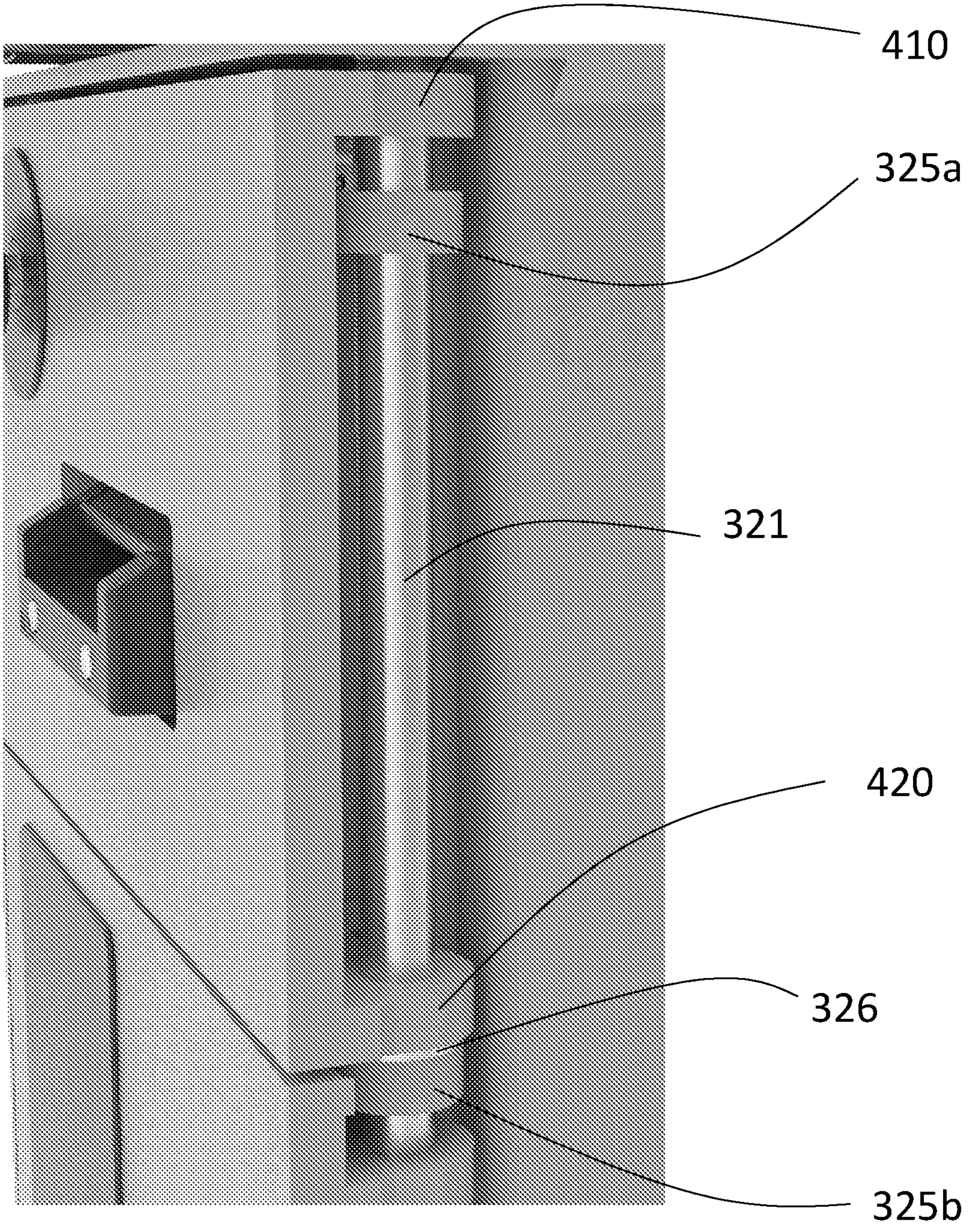
FIG. 8 shows a closeup view of the top door portion of the hinge of FIGS. 7A-7C.

A closeup view of the top door portion of FIG. 7A is shown in FIG. 8. In this view, spacer 326 can be seen compressed between wall-side knuckle 325*b* and door-side knuckle from plate 420. It is this spacer that sets the vertical alignment of the top door 400 with respect to safe enclosure. The spacer 326 can be in the form of a bearing, washer or series of washers.

Figure 9:
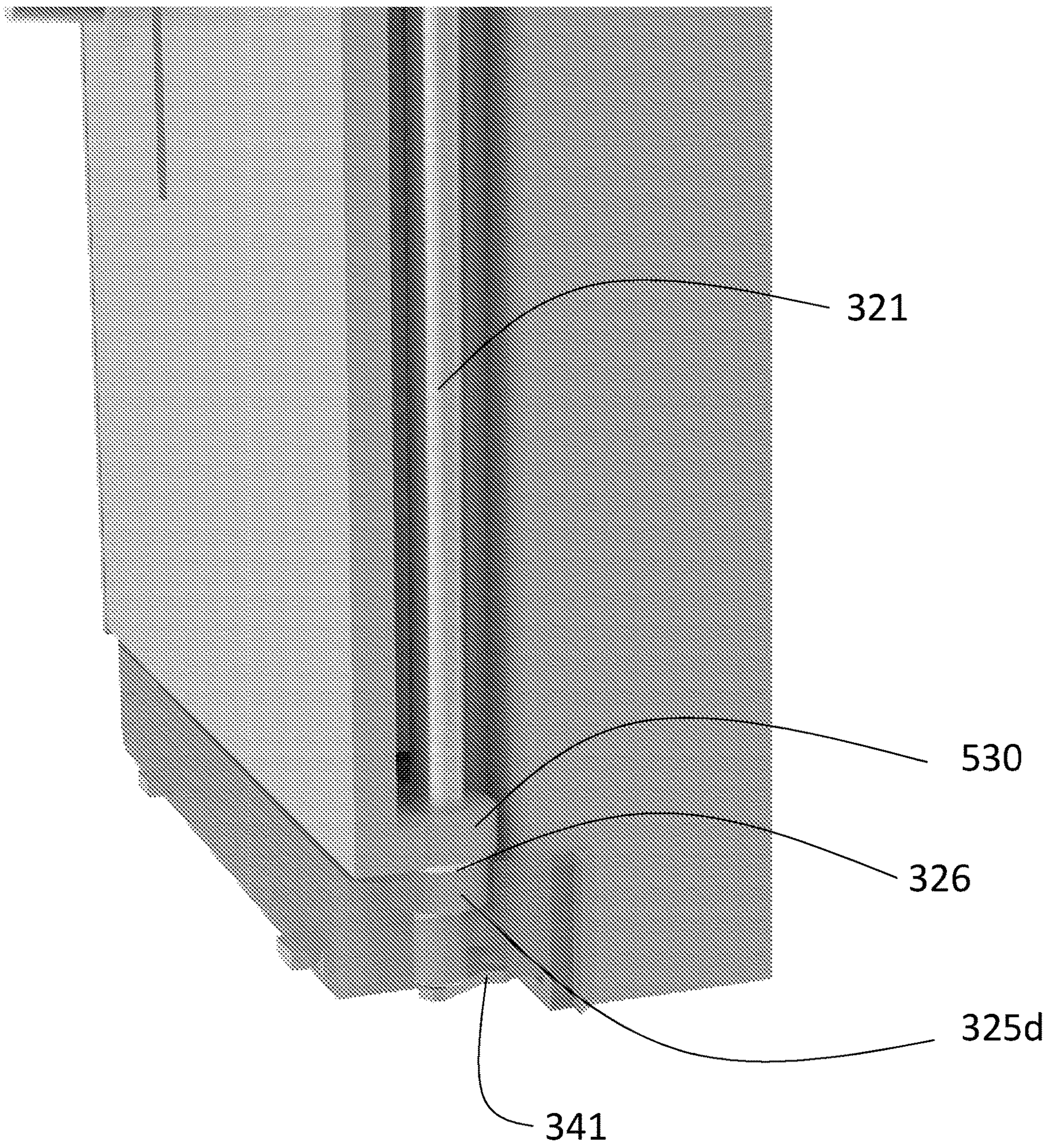
FIG. 9 shows a closeup view of the bottom portion of the hinge of FIGS. 7A-7C with the base plate hidden from view for clarity.

A closeup view of the bottom door portion of FIG. 7A is shown in FIG. 9 with the base plate 340 hidden from view for clarity. A second spacer 326 is placed between wall-side knuckle 325*d* and door-side knuckle from plate 530 to set the vertical alignment of the bottom door 500 with respect to the safe enclosure. Preferably, the nominal gaps between the bottommost wall-side knuckles of the wall and the bottommost door knuckles are made the same for all doors 400, 500 in the safe 300 such that the same spacers 326 can be used. Hinge rod 321 sits on a rod retainer clip 341 which is slid under the rod 321 and secured to the bottom of the rod 321 after the rod 321 is assembled into the safe 300.

Figure 10:
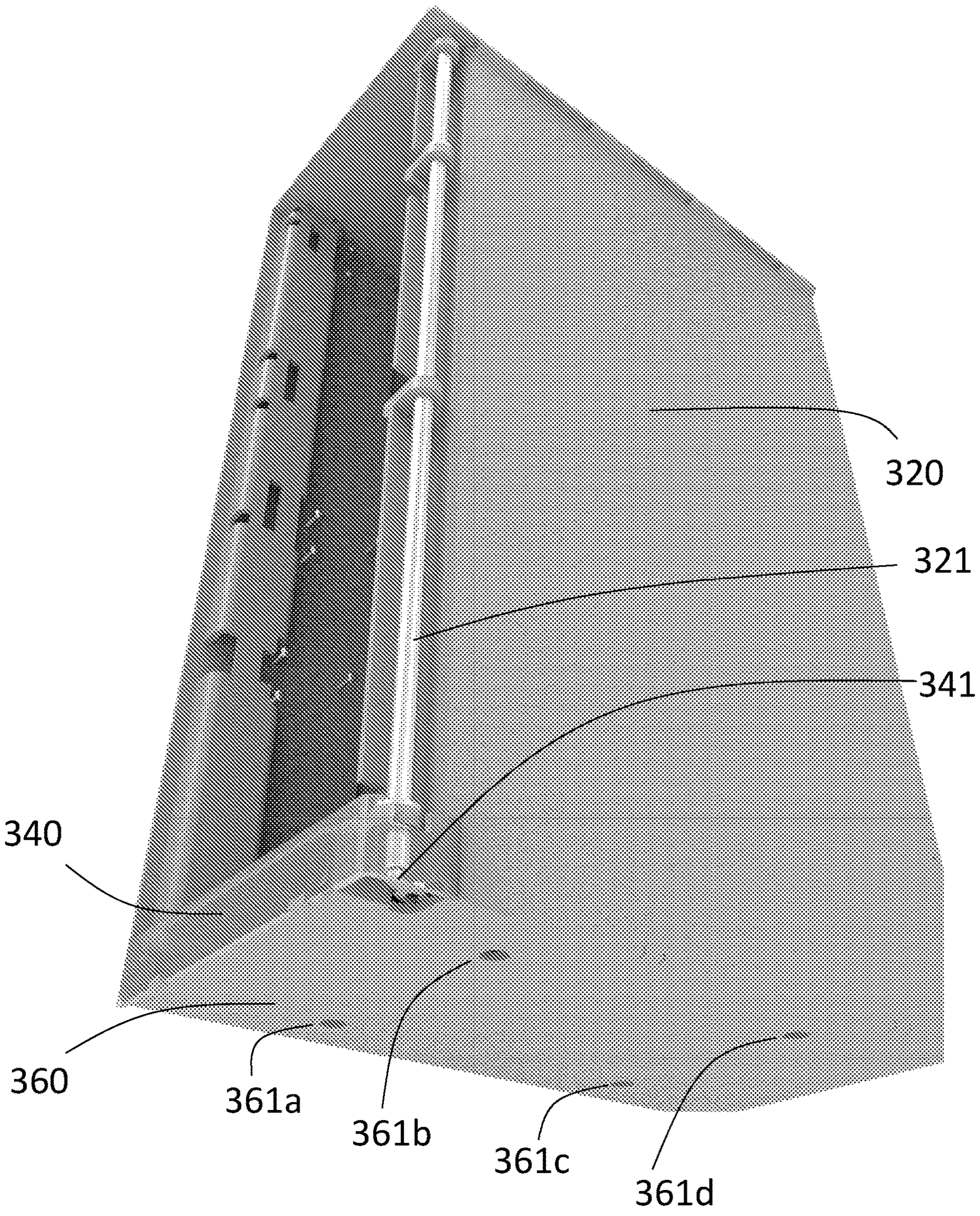
FIG. 10 shows an upward facing perspective of FIG. 9 with covers hidden, base plate transparent, and electronics removed for clarity.

The base of safe 300 can be seen more clearly in FIG. 10. Four mounting holes 361*a*, 361*b*, 361*c*, and 361*d* are located near the four corners of the safe's bottom surface 360 and are used for securing the safe 300 to the floor with floor anchors. Hinge retainer clip 341 is more clearly seen from this angle with base plate 340 shown semi-transparent for clarity. The retainer clip 341 prevents removal of the rod 321 from outside the safe 300 without having access to the lower door 500.

Figure 11:
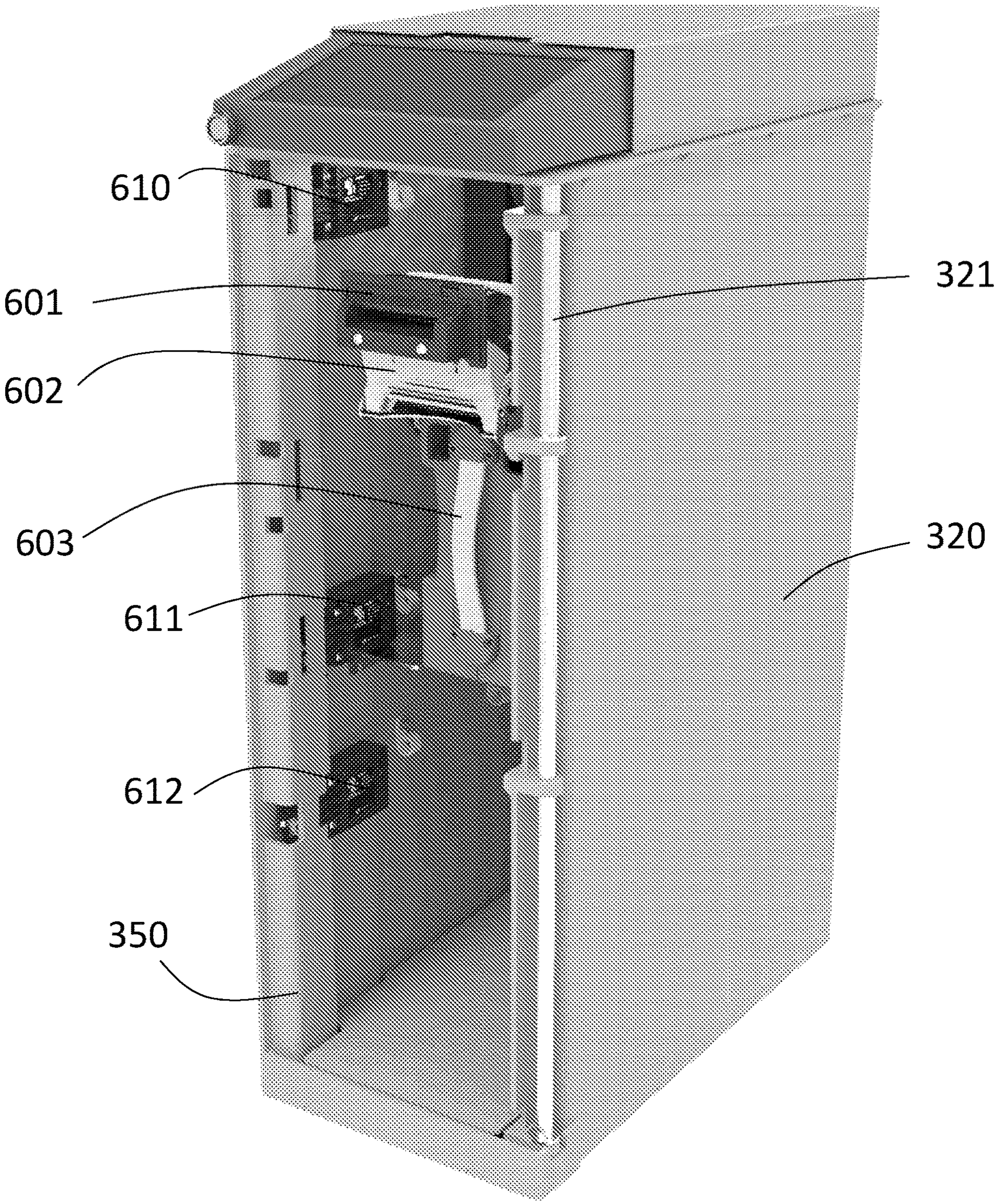
FIG. 11 shows a view of the exemplary secure vault apparatus of FIG. 3 with the hinge covers hidden and doors removed for clarity.

Turning attention to the left side wall of the safe, the various side-wall mounted electronic locks 610, 611, and 612 shown in FIG. 11 are disposed within the interior of the safe 300. These locks extend a locking plunger rod into locking U-channel 350 when the locks electronically detect the presence of a bolt.

Figure 12:
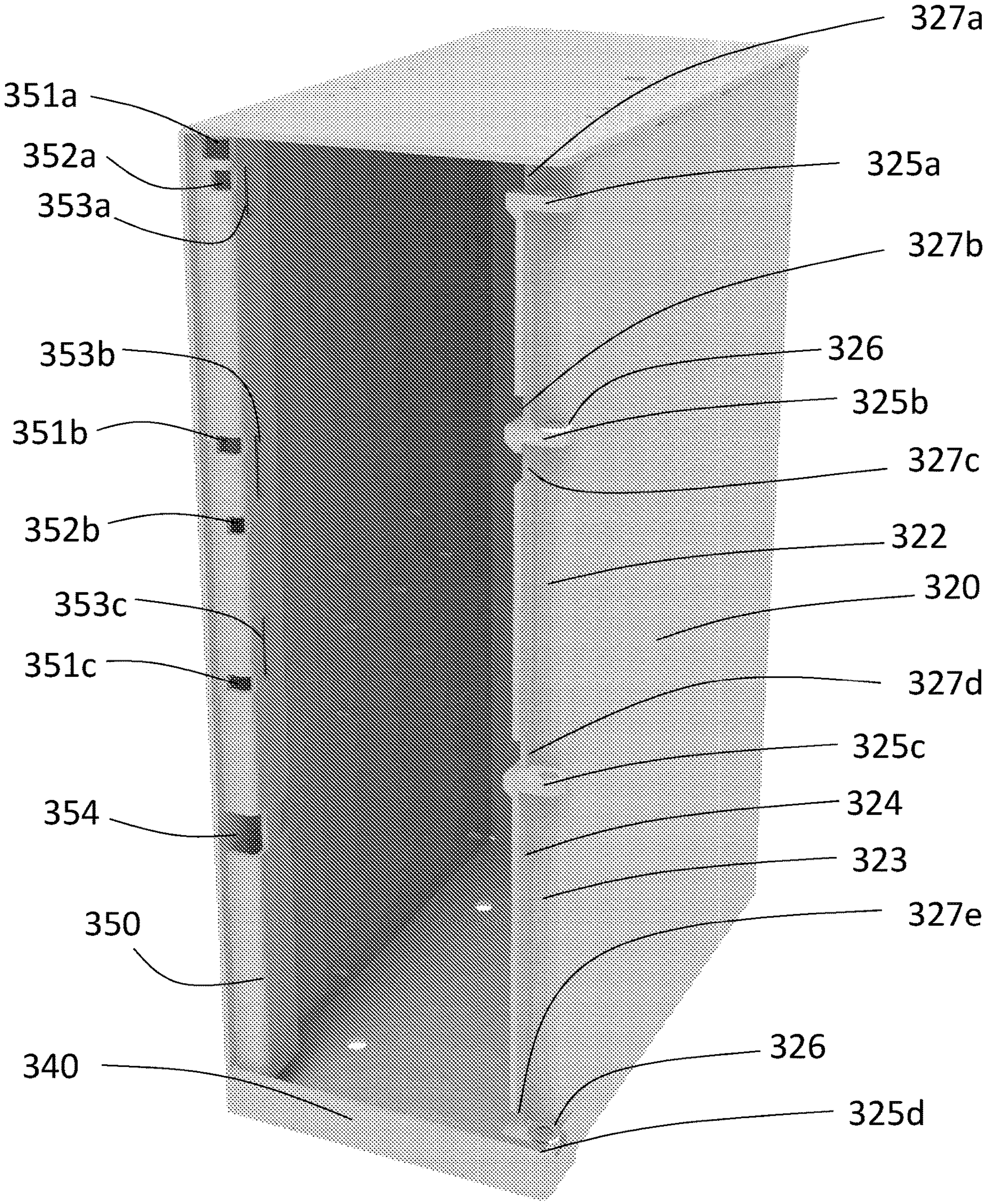
FIG. 12 shows the exemplary secure vault apparatus of FIG. 3 absent of doors, hinge pin, and user interface assembly for clarity.

FIG. 12 highlights the various openings in U-channel 350 that interface to features on doors 400, 500 when the doors 400, 500 are closed. Openings 353*a*, 353*b* and 353*c* are openings through which the bolts from the doors 400, 500 extend when the doors 400, 500 are closed and lock. Top door 400 bolt enters opening 353*a* where it is locked by electronic lock 610 when detected. Bottom door 500 bolts enter openings 353*b* and 353*c* with a mechanically coupled bolt plate seen in more detail later. Only the bolt in opening 353*c* is locked by 611.

Openings 351*a*, 351*b*, and 351*c* in U-channel 350 permit hardened steel rods mounted to the interior surfaces of each door 400, 500 to pocket into the U-channel when the door 400, 500 is closed. These rods, described in greater detail later, are included in the safe 300 to protect the steel bolts from being cut with saws and grinders. Openings 352*a* and 352*b* in U-channel 350 are for bolt work re-locker mechanisms to trigger spring-loaded automatic extension of the bolts when the door 400, 500 is fully closed.

Viewing the right-side wall of FIG. 12, wall-side hinge knuckles 325*a*, 325*b*, 325*c*, and 325*d* are seen absent their hinge rod 321. These knuckles are preferably welded on to side wall 320 (e.g., walls 323, 324 of hinge pocket) all in vertical alignment with each other, such that the openings formed in each of the knuckles is aligned along the same central vertical axis. Recesses 327*a* through 327*e* are present in the bent portion 322 of right-side wall 320 to allow space for the door-side knuckles (seen more clearly in cross section diagram FIG. 7C). Previously described spacers 326 are shown on their respective knuckles and are installed when threading the doors 400, 500 onto the hinge rod 321 during assembly.

Figure 13A:
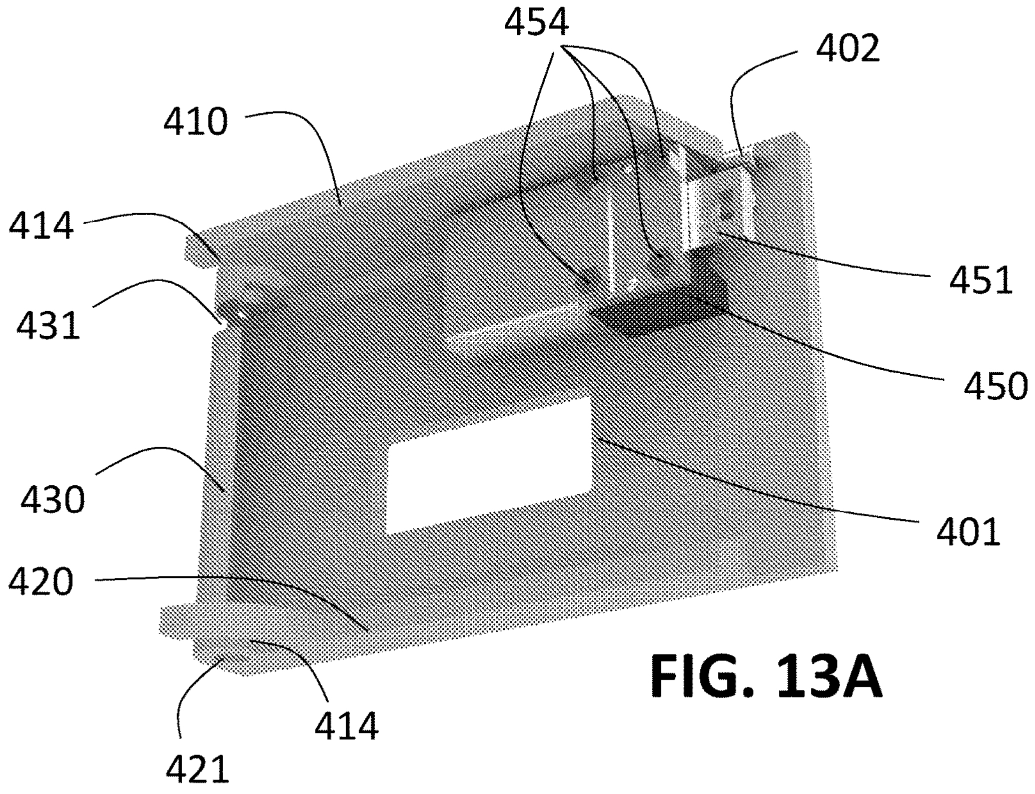
FIGS. 13A and 13B show inside and top perspective views of the upper door of the exemplary secure vault apparatus of FIG. 3.
Figure 13B:
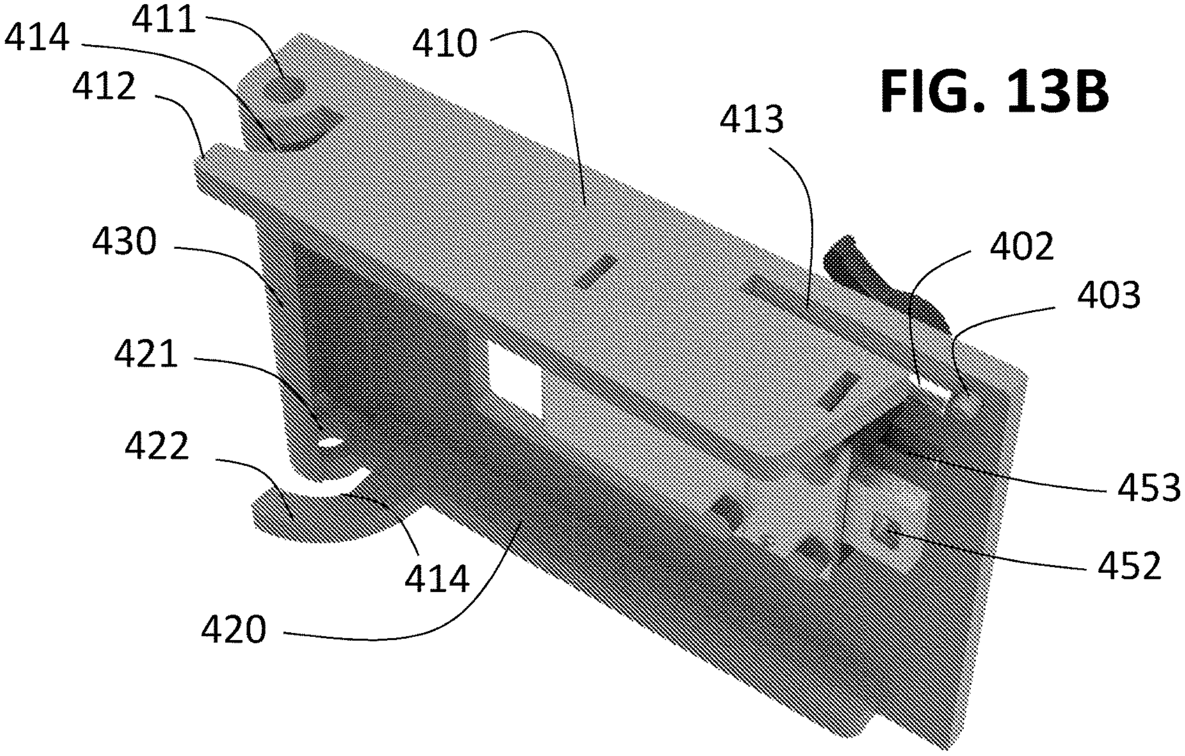

Top door 400 is shown in detail with perspective views presented in FIGS. 13A and 13B. Door 400 is preferably constructed of ⅜" thick steel plate. Bolt work 450 is mounted to top door 400 with four bolts 454 that are preferably hardened steel and threaded into tapped holes within the door 400. Sliding bolt 451 is shown in the extended lock position and is characterized by a hole at its center. The hole is captured by previously mentioned electronic lock 610 (FIG. 11) when extended into the U-channel 350 through opening 353*a* (FIG. 12). When the door 400 is closed against U-channel 350, re-locker lever 453 seats itself in the pocket of opening 352*a*.

Top plate 410 is affixed to door 400, preferably by a filet weld, and includes sidewall capture hook feature 412, hinge rod opening 411, and hardened rod passageway 413. The edge of the plate 410 also forms the curved slot 414 configured and dimensioned to at least partially receive the hinge pocket walls 323, 324 when the door 400 is in the closed position. Preferably the hinge rod opening 411 is sized for the passage of a ½" hinge rod 321 and may be oversized to allow for inclusion of bearings to reduce friction in the hinge operation.

An anti-saw dowel rod 402 is dropped down through passageway 413 during assembly and situated on top of bolt work 450 and is prevented from rolling off the bolt work 450 by the thickness of plate 410. The axis of dowel rod 402 is further trapped by the thickness of plate 410 on one side and pin 403 on the other. Pin 403 is preferably a press-in steel pin indexed inside a hole in door 400. Preferably, anti-saw dowel rod 402 is made of hardened steel material of 5/16" diameter. The length of the rod extends over the extension of bolt 451 when in the locked position. Preferably the rod 402 is free to spin such that when the safe 300 is closed and locked and an attacker attempts to saw bolt 451 from outside the safe 300, the anti-saw dowel rod 402 will spin with the saw's motion, greatly extending the time it takes to cut through the dowel's 402 material.

Lower plate 420 is affixed to the bottom of door 400, preferably by a filet weld, and includes the same capture hook feature 422, curved slot 414, and hinge rod opening 421 features as in the top plate 410 with corresponding hook 412 and hole 411. It is important that these noted features in top plate 410 and bottom plate 420 be vertically aligned to one another for a straight hinge rod 321 to pass through. Top plate 410 and lower plate 420 are preferably constructed of ⅜" thick steel plate.

Hinge cover piece 430 is affixed to door 400, preferably by welds, and is preferably a formed steel sheet of 0.048" thickness. The hinge cover piece 430 defines a curved structure, e.g., a semicircular shape, that is configured to at least partially surround the hinge pin 321 such that the hinge pin 321 is covered when viewed from the side of the safe 300. As illustrated in FIGS. 13A and 13B, the curvature of the hinge cover piece 430 can be complementary to the rounded structure of the plates 410, 420 surrounding openings 411. A slot 431 in hinge cover 430 is sized to allow for the passage of wall-side hinge knuckle 325*a* (FIG. 12) to pass through as the door 400 is opened. The function of hinge cover piece 430 is to both hide hinge rod 321 for a more aesthetically pleasing side profile appearance (see FIG. 4) as well as to eliminate accessible gaps between hinge rod 321 and door 400 of the safe 300 that may be exploited by an attacker with a prybar to force the door 400 open.

Figure 14:
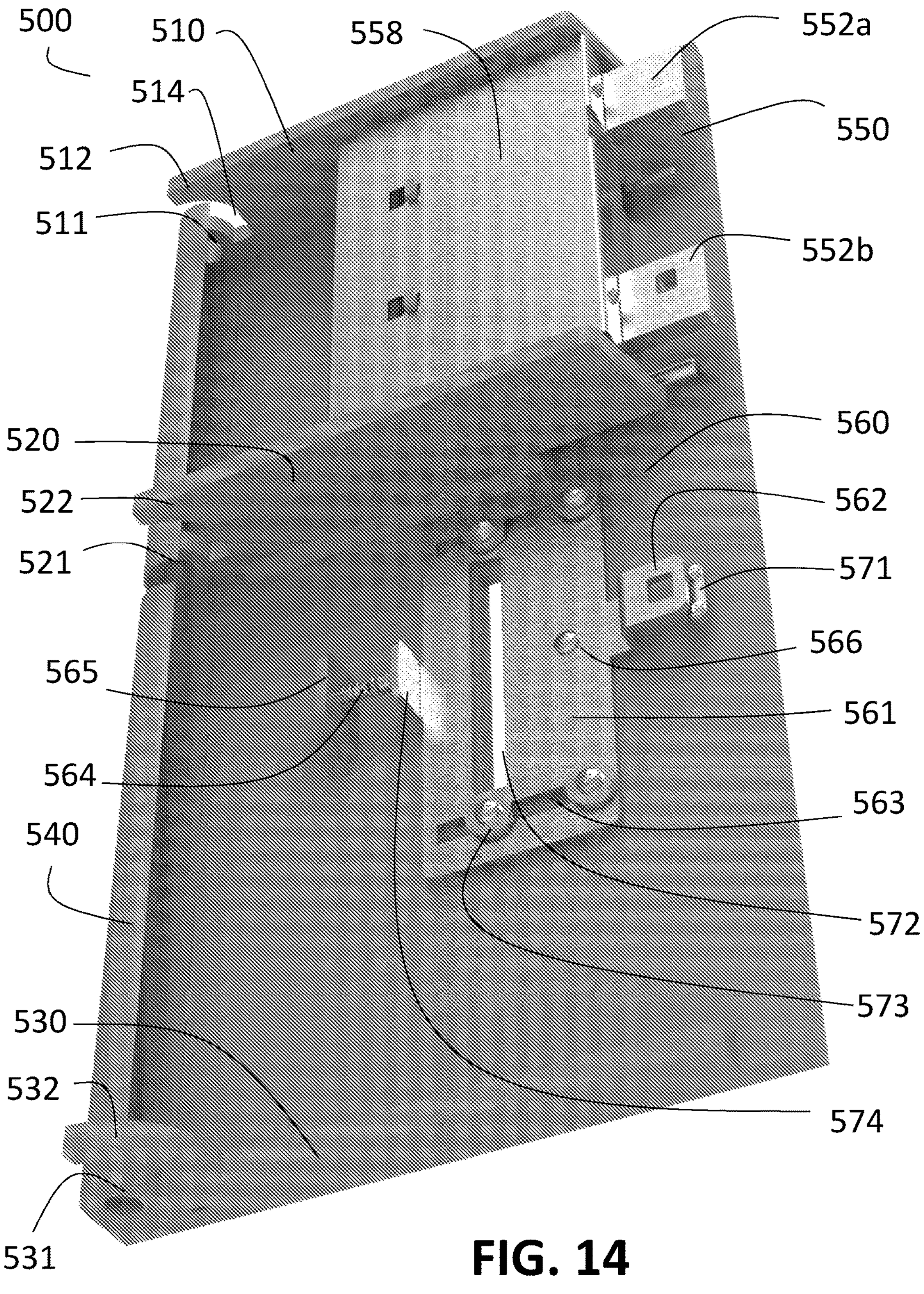
FIG. 14 shows an inside view of the lower door of the exemplary secure vault apparatus of FIG. 3.
Figure 15:
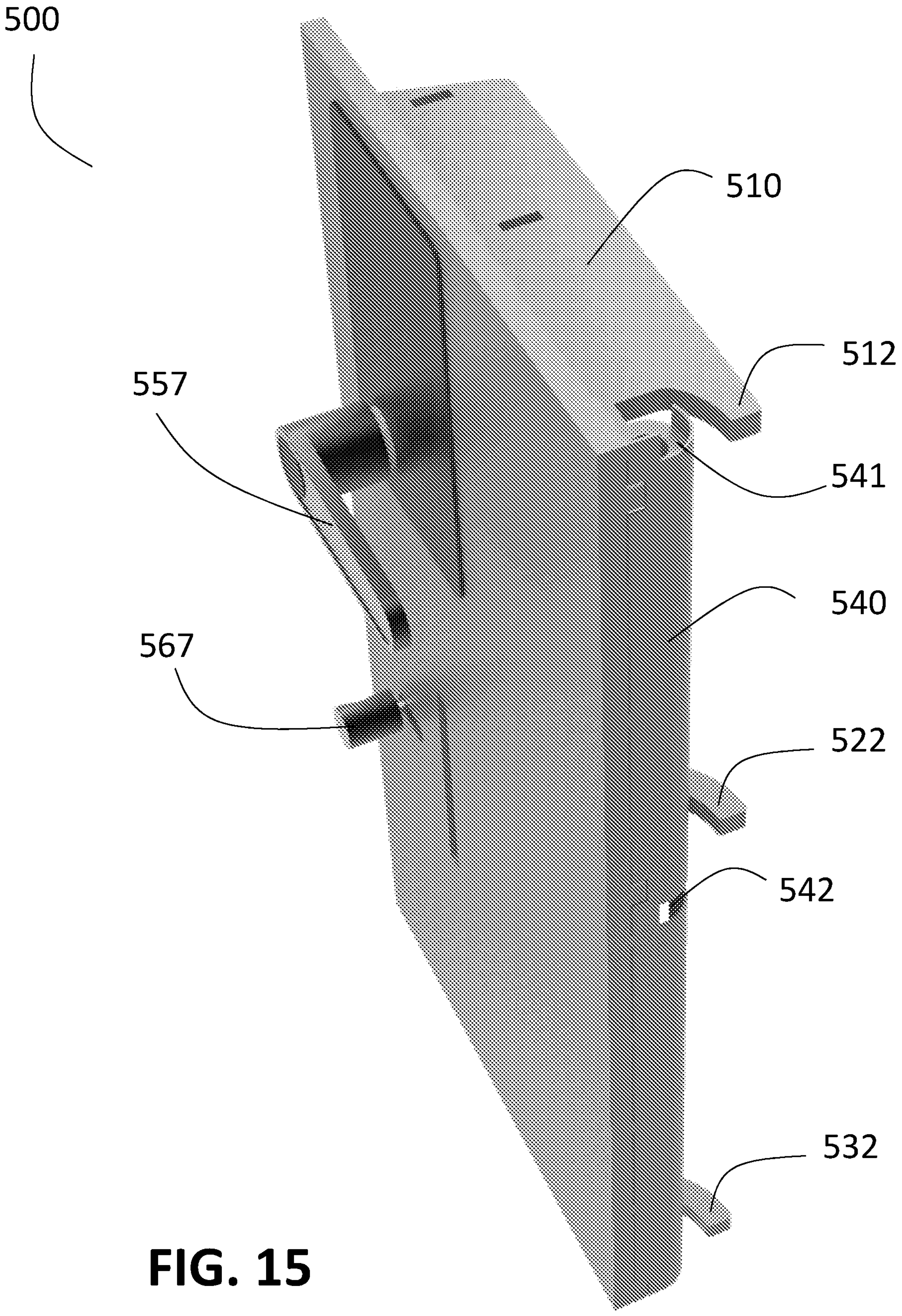
FIG. 15 shows a hinge-side view of the lower door of FIG. 14.

Lower door 500 is detailed with a perspective inside view where the bolt work 550 is shown in the extended, locked orientation and envelope sliding mechanism 560 in the retracted, unlocked position in FIG. 14 and is shown from the hinge side perspective in FIG. 15. The bolt work 550 of lower door 500 is taller than that of bolt work 450 of upper door 400 (FIG. 13A), to provide added security of two sliding bolts 552*a* and 552*b* rather than one (bolt 451) used in the smaller top door 400. Bolt work 550 has bolt work cover 558 and is sandwiched between top door plate 510 and middle door plate 520. Door plates 510 and 520 together with lower door plate 530, all have analogous sidewall capture hook features 512, 522, and 532 (and corresponding curved slots 514) to match the features 412, 414 and 422 of top door 400 (FIG. 13B). Similarly, all three door plates 510, 520, and 530 have hinge rod holes 511, 521, and 531, respectively, to allow for the hinge rod 321 to pass through just as with features 411 and 421 of top door 400. Hinge cover 540 is formed with the same profile and material as hinge cover 430 used in the top door 400 and serves the same purpose. Slots 541 and 542 (FIG. 15) in hinge cover 540 are sized to allow for the passage of wall-side hinge knuckles 325*b* and 325*c* (FIG. 12) to pass through as the door 500 is opened.

Figure 16:
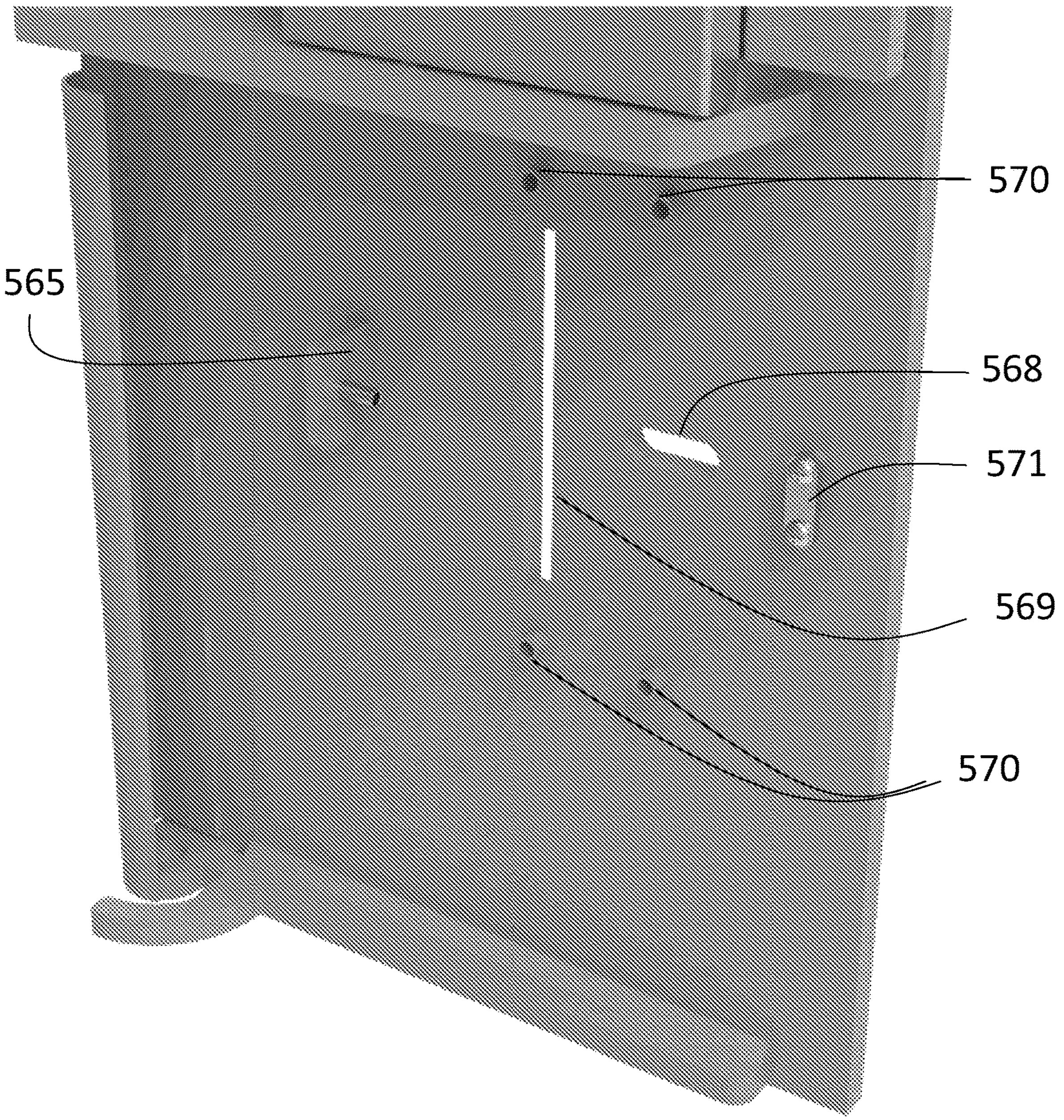
FIG. 16 shows a view of an envelope slider mount on the inside of the lower door of the exemplary secure vault apparatus of FIG. 3, with the slider hidden from view for clarity.

An envelope slider mechanism 560 is comprised of a slidable plate 561 that is biased towards outside of the door 500 with a compression spring 564 positioned between the slidable plate 561 against spring retaining flange 574 and a stationary plate 565 affixed to the inside of door 500. The slidable plate 561 has an opening 572 for envelopes to drop through when slid into the open position as shown in FIG. 14. Slidable plate 561 also has a bolt feature 562 with a central hole that is engaged with and gets captured by electronic lock 612 (FIG. 11) when in the extended position with the door 500 closed. When extended and locked, the envelope slider bolt 562 is seated in U-channel opening 354 (FIG. 12). Slidable plate 561 is connected to handle 567 (FIG. 15) by screw 566 (FIG. 14). When handle 567 is shifted horizontally, slidable plate 561 slides along tracks 563 located at the top and bottom of the plate held down by washers 573 mounted to standoffs 570 (FIG. 16).

Figures 17A, 17B:
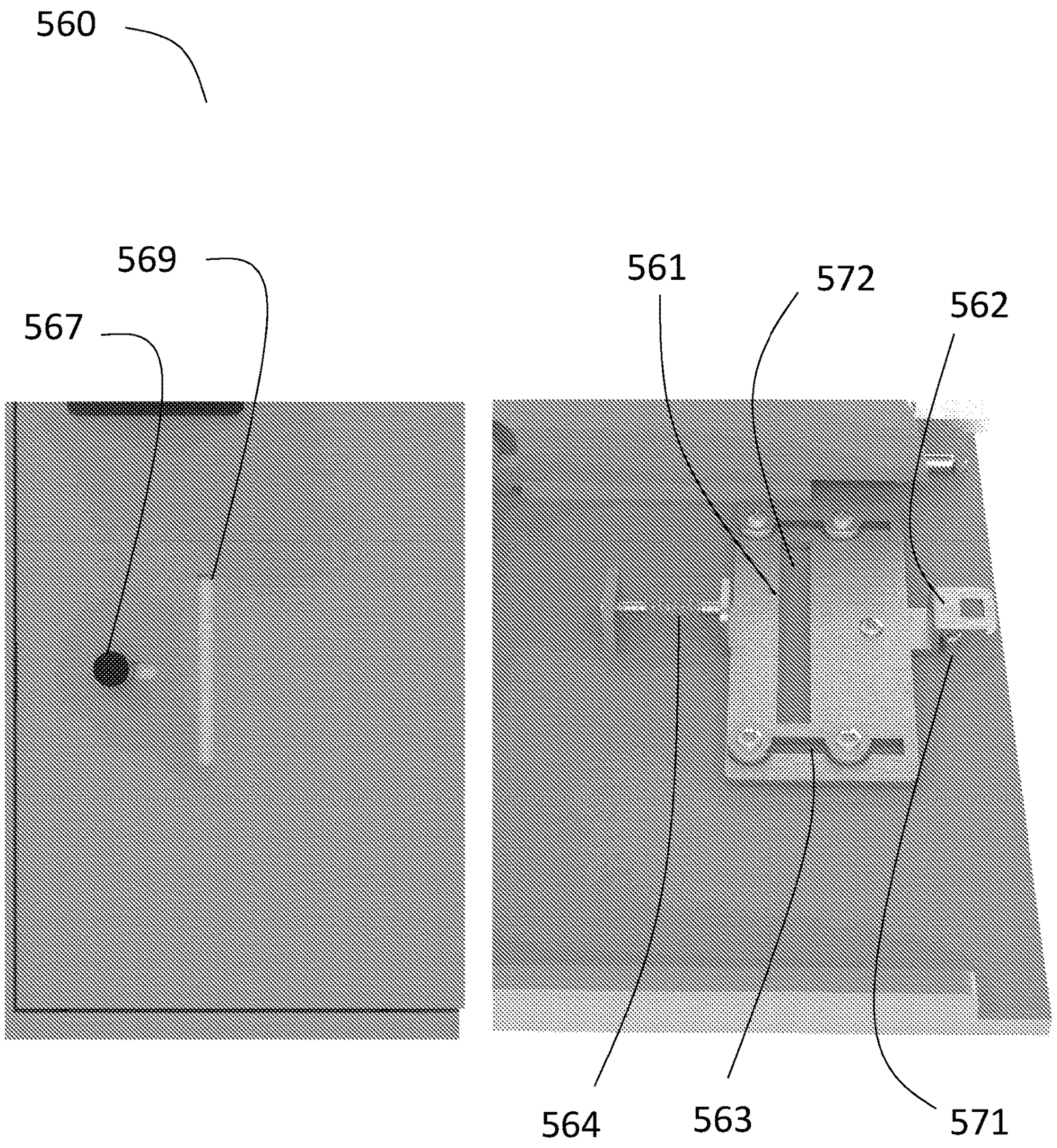
FIGS. 17A and 17B show views of the envelope slider when closed from outside and from inside of the secure vault apparatus, respectively.

FIGS. 17A and 17B illustrate the envelope lock mechanism 560 when in the closed and locked position viewed from both in front of and behind bottom door 500. When in the locked position, bolt 562 is extended overtop of electronic lock plunger retention feature 571 (better seen in FIG. 16). Lock plunger retainer 571 serves to securely prevent the extended lock plunger from electronic lock 612 from excessive force when an operator is pressing the handle in the rightward direction to slide open the door when locked. Note that even when in the locked position, bolt 562 situated in U-channel recess 354 does not present an impediment to opening lower door 500. Therefore, even while the envelope slider bolt 562 is extended into the U-channel recess 354, lower door 500 can be independently unlocked and opened without mechanical interference. In this way, safe operators can open door 400 without concern for the state of the envelope door sliding mechanism. When door 500 is opened, the plunger of electronic lock 612 is pulled away from the central hole of bolt 562, thereby allowing for the slider to slide horizontally to the open position if a safe operator were to push the handle 567 rightward. When door 500 is closed and locked again, the extended envelope slider bolt 562 will re-seat in channel 354 and be once again captured by the plunger of electronic lock 612 and once again lock preventing rightward sliding motion.

Figure 18A:
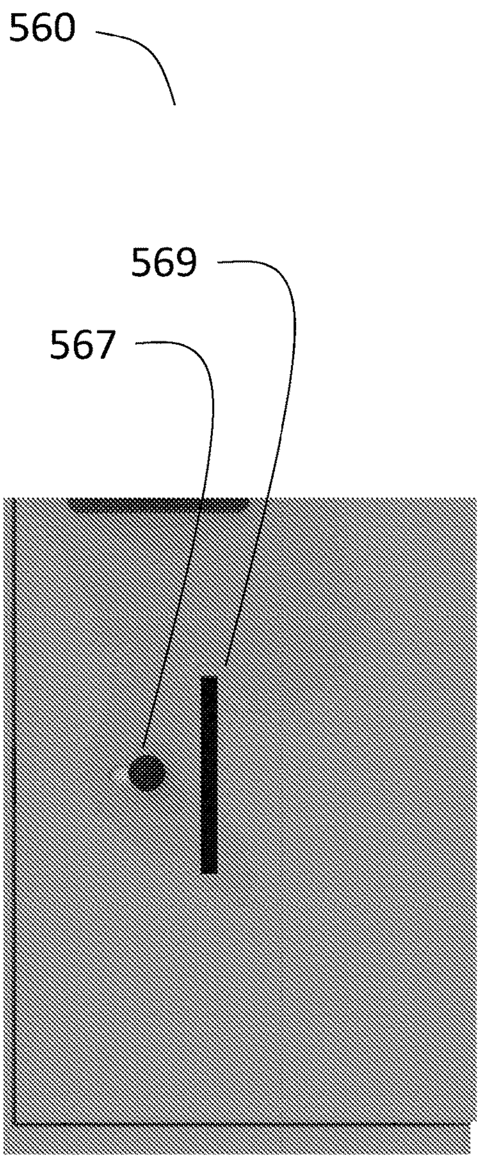
FIGS. 18A and 18B show views of the envelope slider when open from outside and from inside of the secure vault apparatus, respectively.
Figure 18B:
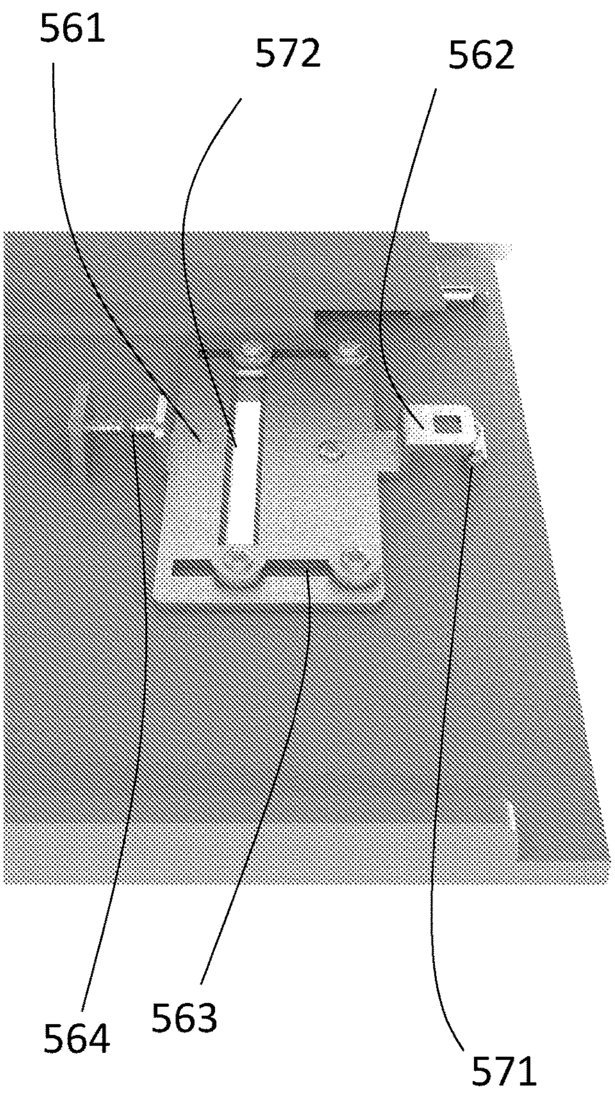

FIGS. 18A and 18B illustrate the envelope lock mechanism 560 when in the open position viewed from both in front of and behind bottom door 500. When unlocked, opening 572 in slidable plate 561 aligns to exterior door opening 569 and envelopes can freely pass into the interior volume of the safe behind door 500.

Figure 19:
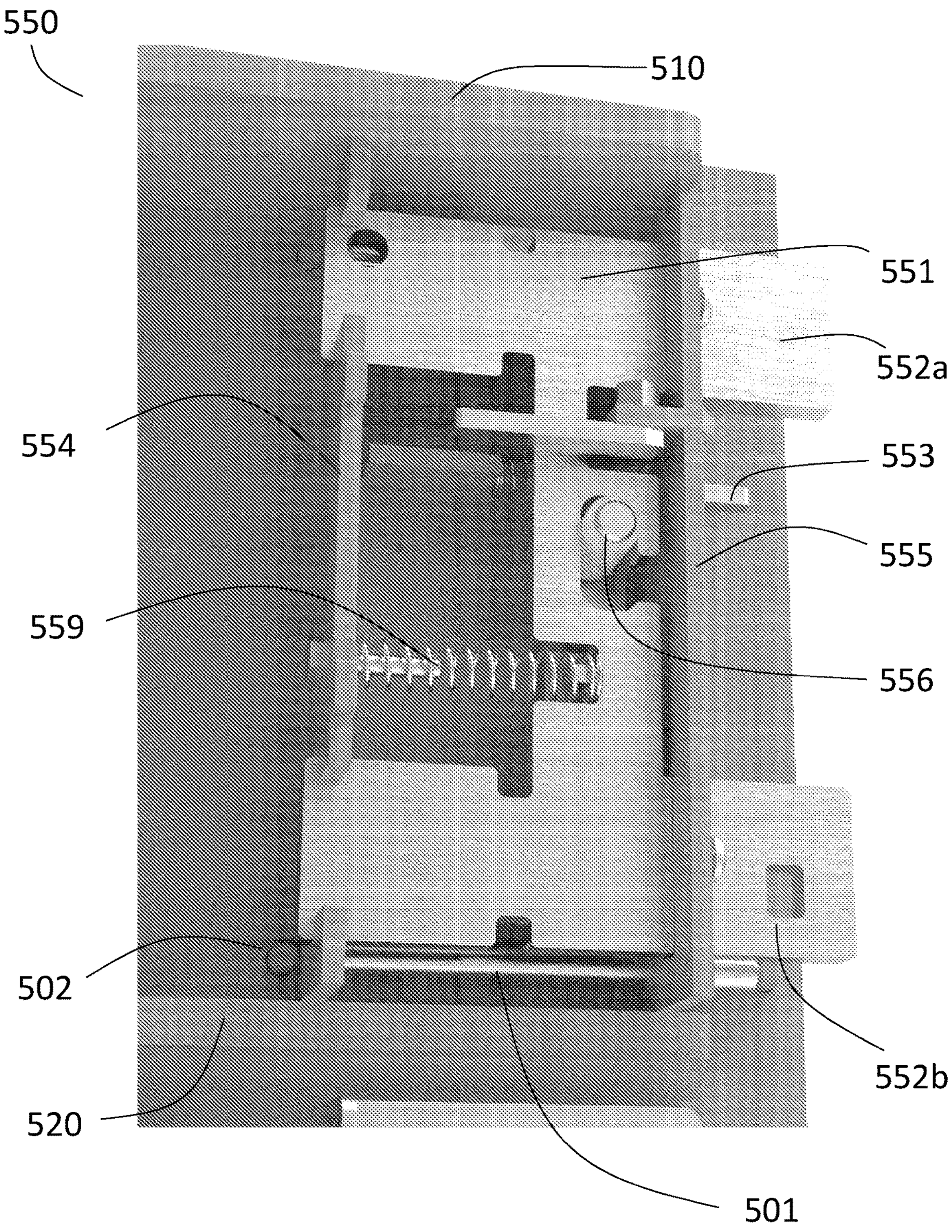
FIG. 19 shows a detailed view of the bolt work on the lower door of the secure vault apparatus with the bolt work cover hidden for clarity.
Figure 20:
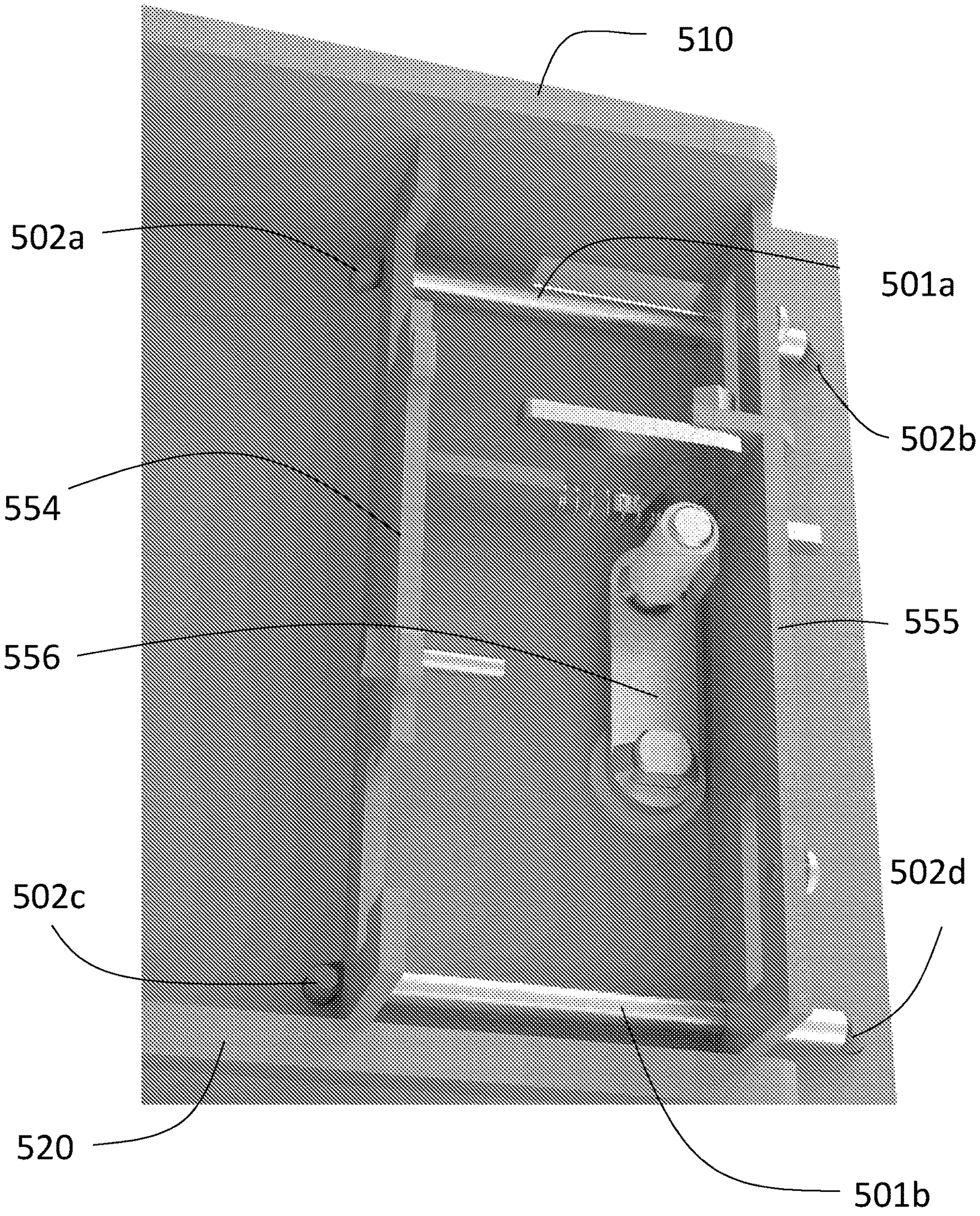
FIG. 20 shows a view of the bolt work of FIG. 19 with the bolt hidden for clarity.

Returning now to the bolt work 550 of lower door 500, a detailed drawing with the cover removed is shown in FIG. 19 and then further with the bolt plate 551 removed in FIG. 20. Bolt plate 551 has two protruding bolt sections 552*a* and 552*b* that engage with the U-channel when in the extended locked orientation at locations 353*b* and 353*c*, (FIG. 12) respectively. Bottommost protruding bolt 552*b* has a hole in its center which is captured by the plunger of electronic lock 611 (FIG. 11) when locked. Bolt plate 551 is translated parallel to the surface of the door 500 when articulated by cam assembly 556 (FIGS. 19 and 20) which is driven by operator-facing door handle 557 (FIG. 15).

Rear bolt work plate 554 and front bolt work plate 555 are affixed to door 500. The two plates 554, 555 together provide support for bolt plate 551 and serve to trap hardened anti-saw dowel rods 501*a* and 501*b* located at the top and bottom of the bolt work assembly. Bolt plates 554 and 555 engage with top plate 510 which is also affixed to door 500. Anti-saw dowel rods 501*a* and 501*b* operate in an analogous manner to the anti-saw rod 402 of the top door (FIGS. 13A and 13B). Rod 501*a* is trapped axially by pins 502*a* and 502*b* and rod 501*b* is trapped axially by pins 502*c* and 502*d*. Rods 501*a* and 501*b* preferably extend the length of the bolt work while bolts 552*a* and 552*b* are in their extended-most orientations such that attempts to saw the bolts must first pass through the hardened dowel of 501*a* positioned above 552*a* and dowel 501*b* positioned below 552*b*. Just as with previously described rod 402, rods 501*a* and 501*b* are preferably free to spin when contacted with saws or grinders to extend the time needed to cut through them. When the door 500 is closed, the rod 501*a* and its respective axial trapping pin 502*b* fit inside recess 351*b* of the U-channel (FIG. 12). Similarly, rod 501*b* and its pin 502*d* fit inside recess 351*c* of the U-channel.

When in the unlocked orientation, bolt plate 551 is held back against re-locker mechanism 553 and re-locker spring 559 is held in tighter compression. The lever of re-locker 553 engages with recess 352*b* when the door is fully closed causes a release of bolt plate 551 allowing compression spring 559 to expand sending bolts 552*a* and 552*b* into their respective U-channel openings 353*b* and 353*c* (FIG. 12).

Figure 21:
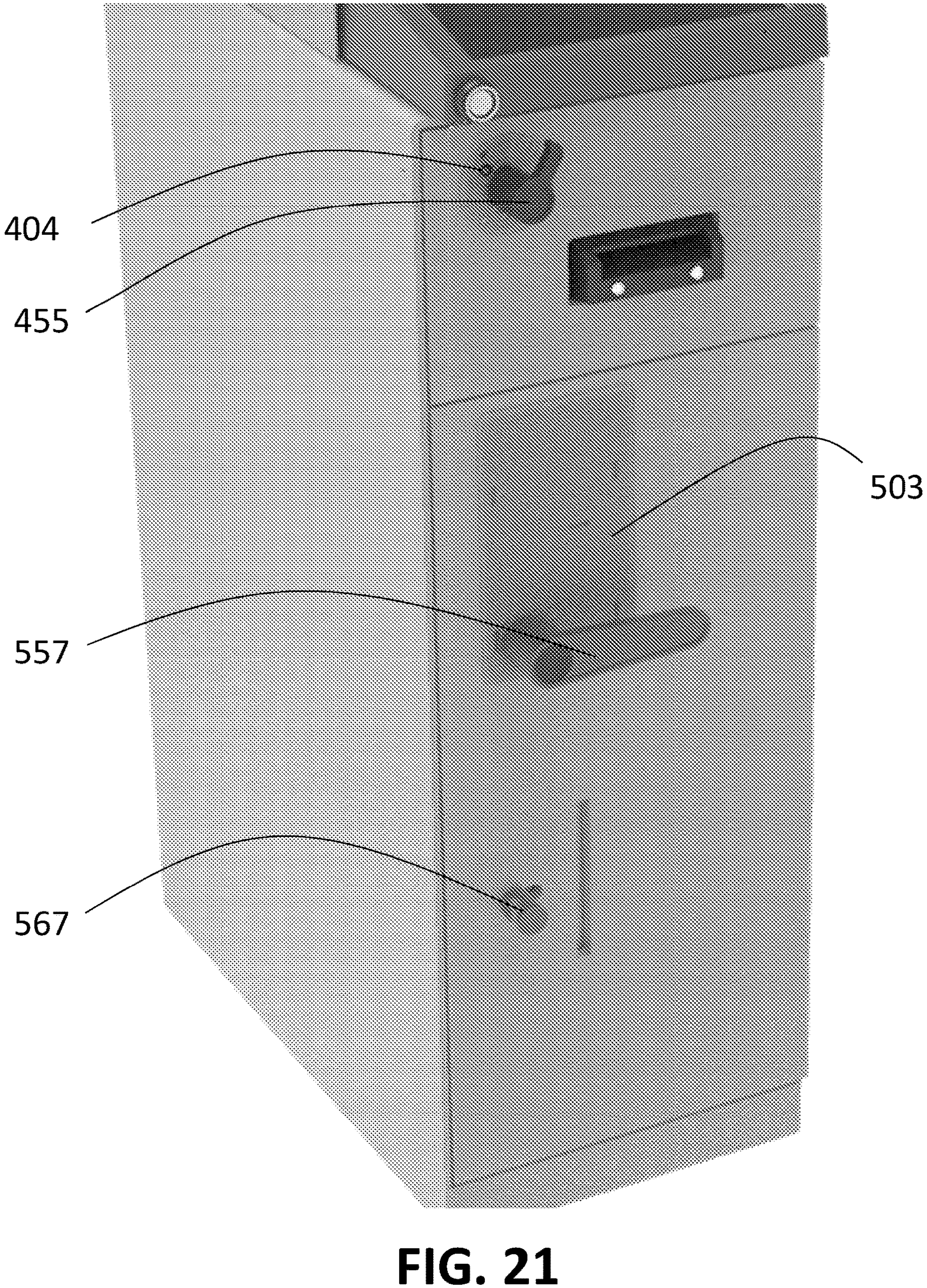
FIG. 21 shows an exterior view of the secure vault apparatus with door hole coverings made semi-transparent for clarity.

The bolt work of top door 400 is indexed to the door 400 through the use of four security bolts 454 (FIG. 13A). Those bolts pass into threaded holes that would be visible around handle 455. Trim piece 404 shown in FIG. 21 is designed to cover up the exposed holes in door 400 and is made semi-transparent in FIG. 21 for clarity. The bolt work of bottom door 500 is indexed to the door preferably with slot and tab construction whereby alignment tabs protruding from bolt work plates 554 and 555 engage with slots in the surface of door 500 as well as to top plate 510 to ensure the bolt work support structure meets at square corners and is properly aligned to the door prior to welding. Slot and tab features in the door 500 are hidden with trim piece 503 which is shown semi-transparent in FIG. 21 for clarity. Both trim pieces 404 and 503 can be constructed of formed or molded plastic, labels, or other types of aesthetic decals and may be affixed to the safe with adhesives, screws, plugs, or the like. Alternatively, epoxies, fillers, thick paints or other wet applied coverup materials can be applied instead of plastic trim or labels, and then cured dry.

Figure 22:
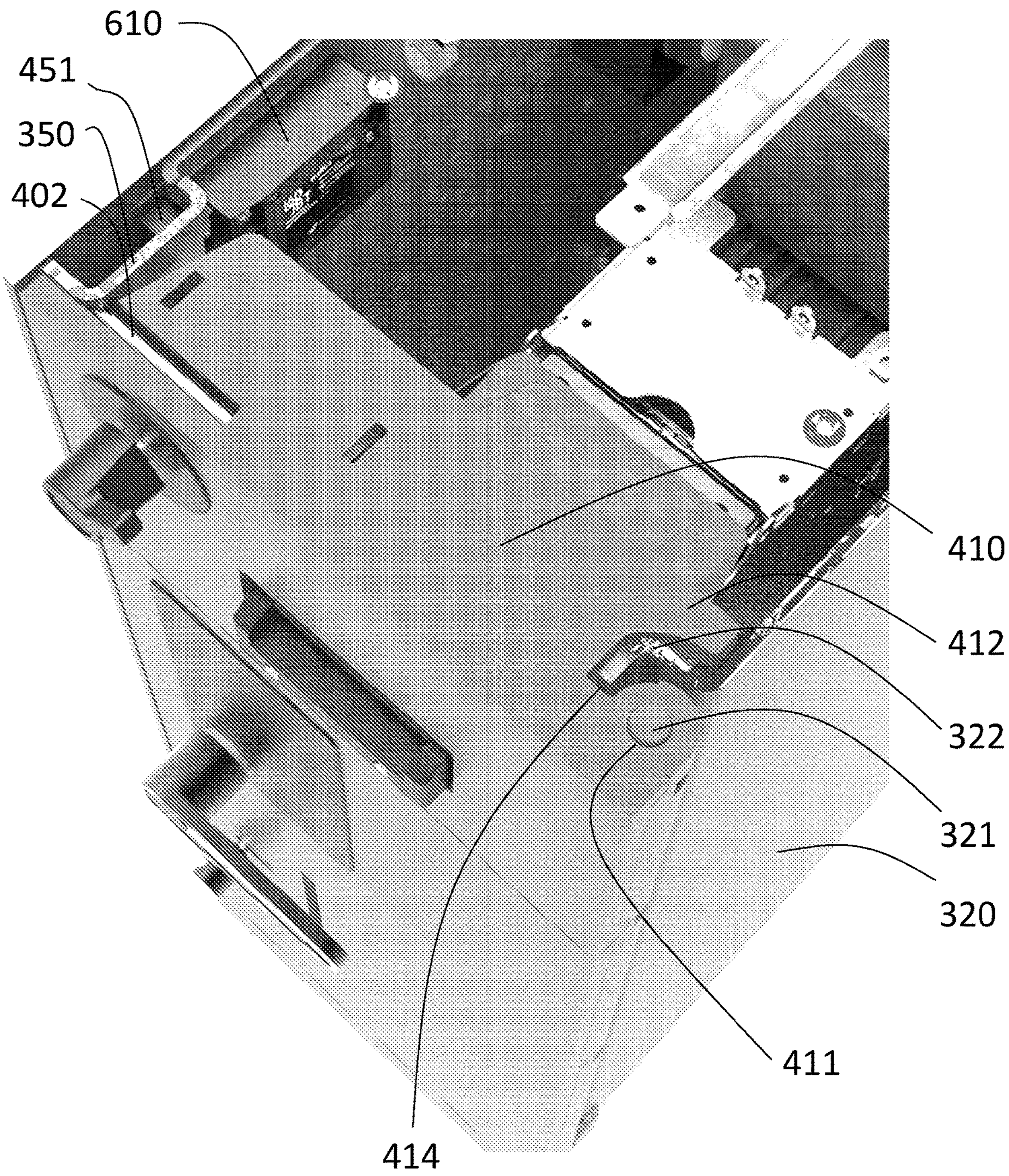
FIG. 22 shows a cross-section view of the door hinge capture mechanism of the exemplary secure vault apparatus of FIG. 3.

FIG. 22 shows a cross section of top door 400 in the closed and locked position with bolt 451 extended into U-channel 350 and locked by electronic lock 610. Hardened dowel rod 402 can be seen also extending into U-channel 350 right in line with bolt 451 such that cutting through the rod 402 must occur prior to reaching bolt 451. Hinge rod 321 is passing through top plate 410 through hole 411. Hook feature 412 of top plate 410 is wrapped around side-wall bend 322, with the bend 322 disposed within the curved slot 414. Even if the hinge rod 321 is fully removed from the safe during an attack, hook 412 serves to trap the door firmly inside the safe 300 from being pried outwardly away. For attackers attempting to punch the door inwards with a sledgehammer, the combined resilience of hinge rod 321 and side-wall bend 322 just behind the right side edge of the doors serve as a stiff backstop.

Figure 23:
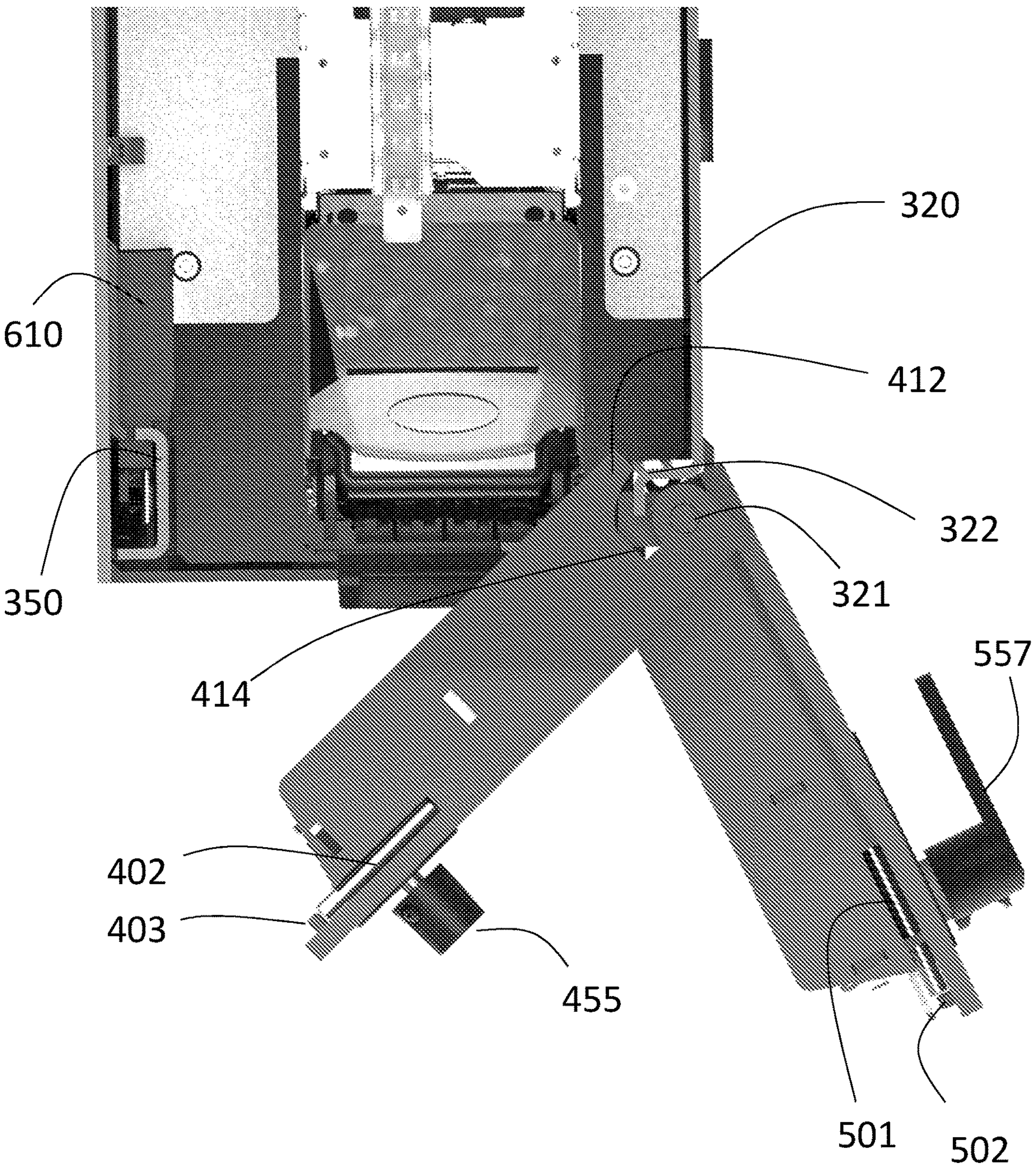
FIG. 23 shows a top-down view of the door hinge capture mechanism of FIG. 22 with both doors partially opened.

A top-down view of the same cross section is shown in FIG. 23 with top door 400 partially opened and bottom door 500 fully opened. Here it is shown how door hook feature 412 wraps around right-side wall bend feature 322 as the doors are opened. A clearer view of hardened dowel rods 402 in door 400 and 501 in door 500 are also visible. The wall bend 322 remains at least partially within the curved slot 414, even with the door in the fully open position. The hinge rod 321 remains surrounded on all sides (except top and bottom ends) by the wall bend 322 of the hinge pocket and the hinge cover 430.

Figure 24:
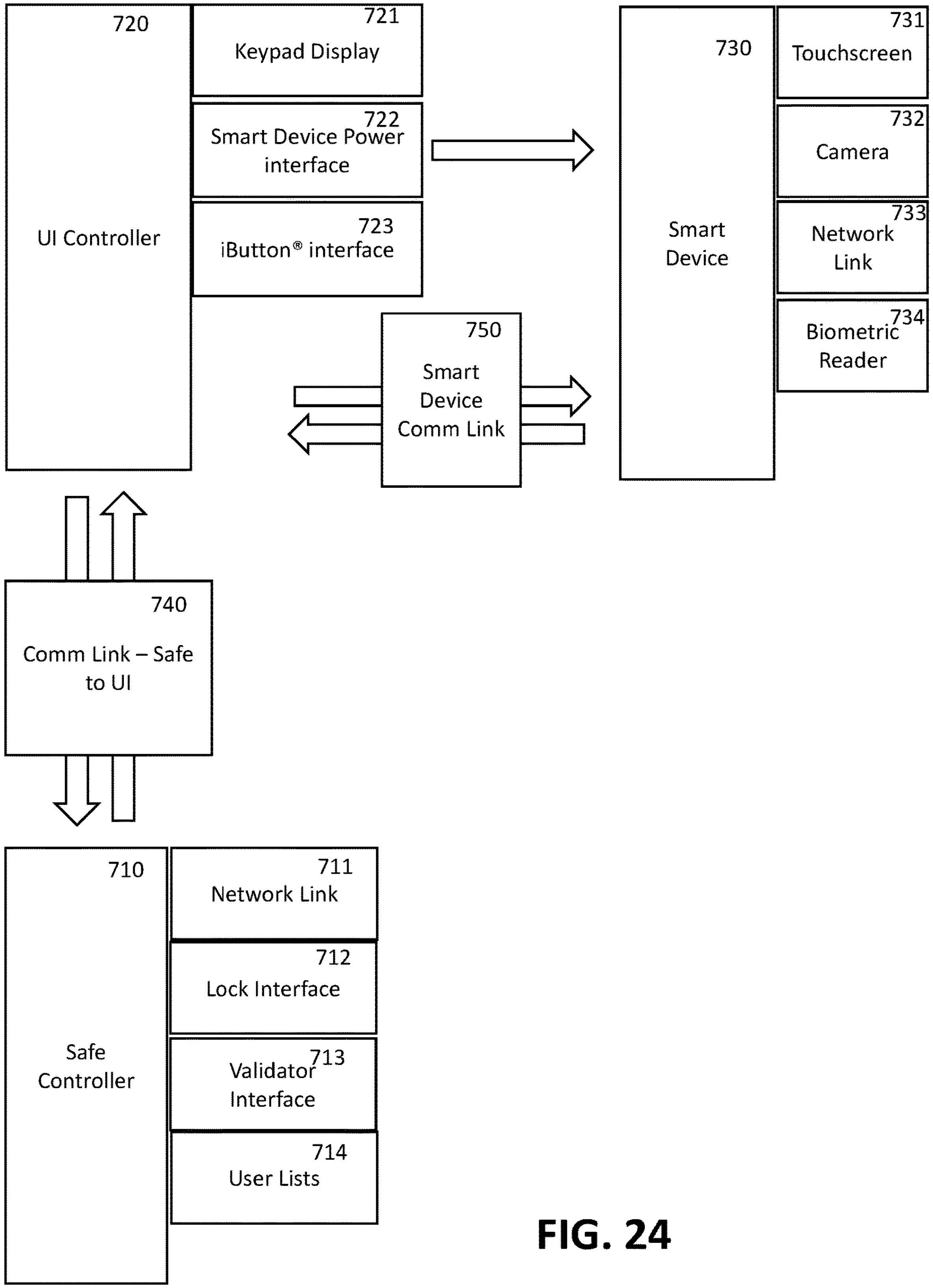
FIG. 24 shows a diagram of the electronic architecture of the exemplary secure vault apparatus including two user interfaces.

The mechanical arrangement described particularly with respect to the discussion of FIGS. 3-6 support an architectural arrangement shown in FIG. 24 whereby the safe contains a safe controller 710, user interface controller 720, and a smart device 730.

The safe controller 710 is placed within the interior protected volume of the safe, preferably in the space behind the top door 400. The controller 710 can include a processor such as a CPU, microprocessor, or similar running an embedded program specifically tailored for the smart safe behaviors desired. The controller 710 includes lock interface 712 configured to provide power and control signals to the locks that open the various doors of the safe. User Lists 714 are also located within safe controller 710, and contain user identification information along with their associated access control and activity privileges. Validator interface 713 within the safe controller 710 provides control of any banknote validation hardware contained within. A network interface 711 connects the safe controller to remote servers or local databases for the purpose of exchanging activity information and receiving configuration or firmware updates. Configuration updates are used for modification of safe parameters and properties as well as user lists and privileges. Preferably, network link 711 is a low bandwidth wireless link with high building penetration such as a cellular LTE-CAT M1 technology available at the time of this application. Hardwired network connections such as Ethernet or alternative cellular or other non-cellular wireless links could also be used such as Wi-Fi, Zigbee, Bluetooth, LORA, for example.

Safe controller 710 receives input from UI controller 720 via a secured communication link 740 that exists between the two controllers. Link 740 is an encrypted channel and may be implemented using any commonly used wired link such as RS485, RS232, USB, or CAN bus. The UI controller is located outside the secure area of the safe and is housed within keypad display module (user interface 314) (FIG. 6). UI controller contains a keypad display 721 that accepts inputs directly from the safe operator on its button keypad to pass down to safe controller 710 and can display short messages and menu navigation structures on its display. Substantially all activities of the safe can be performed using this interface. Additionally, user interface controller 720 contains a smart device power interface 722 adapted to provide power to a connected smart device 730 and an iButton® reader 723 that can be used for reading iButton® fobs presented to iButton® fob dock 316 (FIG. 6).

Smart device 730 is preferably in the form of a touchscreen tablet running a modern operating system such as Android, IOS, Windows, Linux, or the like, has the ability of running a safe management application along with other store management software which may include point of sale (POS) software, web browsers, customer support applications, service technician guides, and supply or inventory purchasing applications. The safe application takes advantage of several common tablet features such as the touchscreen 731 for providing navigation around the application, camera 732 for snapping pictures of the safe operator, attackers during tamper, or taking pictures of barcodes such as the ones on deposit bags used to pickup from the safe, deposit envelopes going into the safe, or user badges. The tablet can use onboard biometric readers 734 which may be in the form of fingerprint scanners, retina scanners, facial recognition scanners, voiceprint recognition or others to help authenticate safe operators to begin a session. A dedicated tablet network link 733 in the form of a Wi-Fi or high-speed cellular connection is used to update the tablet safe management application, tablet operating system, and may provide backup or alternate network link capability for the safe controller 710's network link 711. It is not expected that safe controller 710's network interface 711 would support updating the smart device application or operating system since the smart device's network link is expected to require substantially larger data throughput to support intensive graphics, video, and operating system updates.

The safe management application communicates with the UI controller over the smart device communication link 750. Comm link 750 is an encrypted channel that is commonly available on tablets and other smart devices and may include Bluetooth, Bluetooth Low Energy (BLE), or USB. The UI controller 720 verifies the authenticity of the connected safe management application by ensuring that communication link 750 is properly encrypted with the correct encryption key.

Once the link 750 is verified to be properly secure, an operator can begin a user session at smart device 730 after properly authenticating with the safe management application through biometric verification, entering a password, or a combination of the two. UI controller 720 relays user session credentials down to the safe controller 710 over link 740 for the safe controller to compare against its user list 714. Safe configuration data from safe controller 710 using comm link 740 is sent over to smart device 730 with link 750 so the safe management application built on smart device 730 is aware of the various features and permissions of users accessing the safe.

Once in an active session, activities performed by the operator at the smart device using the safe application are communicated to UI controller 720 over link 750 and then passed down to the safe controller 710 over link 740 for executing the desired activities and respond back to the UI controller 720 with any resulting updates or status messages to then be relayed over link 750 to the smart device 730.

Link 750 can also transmit warnings related to the safe's condition including error conditions, diagnostic and status information, and tamper alerts up to the smart device's safe application. In response to such warnings, the safe application on the smart device can present those warnings to the operator in a rich user experience inclusive of helpful diagrams, videos or animations of corrective actions, or prompt the start of surveillance video, photographs, or audio recordings in the event of a tamper alert.

When a user session is being driven from smart device 730, UI controller 720 will post a message on keypad display 721 that a remote session is in progress. A remote session can be terminated at any time from the keypad display 721 by pressing its cancel key and re-authenticating a new user session from keypad display 721 directly. In this way, the UI controller cannot be blocked from controlling the safe behaviors even if a smart device was used to begin a user session.

If the smart device 730 (pictured as user interface 312 in FIG. 6) is ever destroyed or malfunctioning given the complexity of modern tablets and its exposure to operator mishap or abuse, interface module 311 can be slid forward to expose the secondary keypad display interface 314 (FIG. 6) which contains the UI controller 720 with associated backup keypad display interface 721 and safe activities can resume uninterrupted until the tablet is repaired or replaced. Preferably, keypad display module interface 314 is constructed of durable spill-resistant materials with highly stable software such that it is much less likely to be destroyed or compromised than smart device (user interface 312) when subjected to rigorous use. The user interface 314 therefore provides a backup interface available to the user for operation of the safe 300 if the user interface 312 is damaged.

Figure 25B:
FIGS. 25A and 25B show left and right side perspective views of a four door safe configuration in accordance with embodiments of the present disclosure.
Figure 25A:

The embodiments described above are considered illustrative only, and should not be viewed as limited to any particular arrangement of features. For example, those skilled in the art will recognize that alternative processing operations and associated system configurations can be used in other embodiments. It is therefore possible that other embodiments may include additional or alternative door arrangements such as the arrangement shown in FIGS. 25A and 25B of a safe having multiple doors. In this particular arrangement, there are three doors that are hinged on the right-side wall and one door hinged on the left side wall. The envelope drop slot is located on the upper left storage door. The slide-out user interface module is located on the top left side of the safe. However, the hinge arrangement discussed previously with respect to safe 300 can be incorporated on both the right and left sides of the safe of FIGS. 25A and 25B to ensure a secure arrangement of the hinge rod.

It is also to be appreciated that the particular process steps used in the embodiments described above are exemplary only, and other embodiments can utilize different types and arrangements of processing operations. For example, certain process steps described as being performed serially in the illustrative embodiments can in other embodiments be performed at least in part in parallel with one another.

While the disclosure has been set forth herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the disclosure as hereinafter claimed is intended to be broadly construed and interpreted, as including all such variations, modifications and alternative embodiments, within its spirit and scope.

What is claimed is:

1. A secure vault apparatus, comprising:

an enclosure formed by a rear wall, a first side wall, and a second side wall;

a hinge pin disposed outside of the enclosure;

a hinge pocket extending from at least one of the first side wall or the second side wall, the hinge pocket defining a space disposed entirely outside of the enclosure and configured to at least partially surround the hinge pin; and at least one door movably coupled to the enclosure by the hinge pin, wherein the at least one door defines a height and defines a front surface of the secure vault apparatus;

wherein the hinge pin is covered entirely by the at least one door along the height of the at least one door at the front surface of the secure vault apparatus; and wherein the hinge pin and the hinge pocket extend at least the height of the at least one door.

2. The secure vault apparatus of claim 1, wherein the first side wall defines a first plane extending along an outer surface of the first side wall, and the second side wall defines a second plane extending along an outer surface the second side wall.

3. The secure vault apparatus of claim 2, wherein the hinge pin is disposed entirely between the first and second planes of the first and second side walls.

4. The secure vault apparatus of claim 2, wherein the hinge pin is disposed entirely between the first plane, the second plane, and an inner surface of the at least one door.

5. The secure vault apparatus of claim 1, wherein the first and second side walls each include a distal edge connected to the rear wall and each include a proximal edge defining an opening extending into the enclosure.

6. The secure vault apparatus of claim 5, wherein the proximal edge of the second side wall includes the hinge pocket formed therein.

7. The secure vault apparatus of claim 6, wherein the hinge pocket includes a first wall extending inwardly towards the first side wall, and a second wall extending perpendicularly from the first wall and parallel to an outer surface of the second side wall.

8. The secure vault apparatus of claim 1, wherein the hinge pocket includes capture knuckles extending from the second wall, each capture knuckle including an opening configured to receive the hinge pin at least partially therethrough.

9. The secure vault apparatus of claim 6, wherein the at least one door includes a top edge, a bottom edge, a first side edge, and a second side edge.

10. The secure vault apparatus of claim 9, wherein the at least one door includes a first flange extending perpendicularly at or near the top edge and a second flange extending perpendicularly at or near the bottom edge.

11. The secure vault apparatus of claim 10, wherein the first and second flange each include an opening formed therein at or near the second side edge of the at least one door, the opening configured to at least partially receive the hinge pin therethrough.

12. The secure vault apparatus of claim 10, wherein the first and second flange each include a retaining hook formed therein at or near the second side edge of the at least one door, the retaining hook defining a curved slot complementary to a wall of the hinge pocket.

13. The secure vault apparatus of claim 12, wherein the curved slot is configured to receive the hinge pocket therein when the at least one door is in a closed position relative to the enclosure.

14. The secure vault apparatus of claim 10, wherein the at least one door includes a curved cover extending from the second side edge between the first and second flanges.

15. The secure vault apparatus of claim 14, wherein the curved cover defines a semicircular wall configured to at least partially surround the hinge pin and prevent exposure of the hinge pin outside of the enclosure.

16. A secure vault apparatus, comprising:

an enclosure formed by a rear wall, a first side wall, and a second side wall;

a hinge pin disposed outside of the enclosure;

a hinge pocket extending from at least one of the first side wall or the second side wall, the hinge pocket defining a space disposed entirely outside of the enclosure and configured to at least partially surround the hinge pin;

a first door movably coupled to the enclosure by the hinge pin, wherein the first door defines a first door height and defines a front surface of the secure vault apparatus; and a second door movably coupled to the enclosure by the hinge pin, wherein the second door defines a second door height and also defines the front surface of the secure vault apparatus;

wherein the hinge pin is covered entirely by the first door along the first door height and is covered entirely by the second door along the second door height at the front surface of the secure vault apparatus; and wherein the hinge pin and the hinge pocket extend at least the first door height and the second door height of the first door and the second door, respectively.

17. The secure vault apparatus of claim 16, wherein the hinge pin supports both the first door and the second door, and extends at least a combined height defined by the first door height and the second door height.

18. A method of secure vault apparatus operation, the method comprising:

positioning at least one door of a secure vault apparatus between an open position and a closed position to expose and cover an enclosure of the secure vault apparatus, wherein the enclosure is formed by a rear wall, a first side wall, and a second side wall of the secure vault apparatus;

wherein the secure vault apparatus includes:

a hinge pin disposed outside of the enclosure;

a hinge pocket extending from at least one of the first side wall or the second side wall, the hinge pocket defining a space disposed entirely outside of the enclosure and configured to at least partially surround the hinge pin; and at least one door movably coupled to the enclosure by the hinge pin, wherein the at least one door defines a height and defines a front surface of the secure vault apparatus; and wherein the hinge pin is covered entirely by the at least one door along the height of the at least one door at the front surface of the secure vault apparatus; and wherein the hinge pin and the hinge pocket extend at least the height of the at least one door.

19. The method of claim 18, wherein:

the first and second side walls each include a distal edge connected to the rear wall and each include a proximal edge defining an opening extending into the enclosure; and the proximal edge of the second side wall includes the hinge pocket formed therein.

20. The method of claim 19, wherein:

the at least one door includes a top edge, a bottom edge, a first side edge, and a second side edge;

the at least one door includes a first flange extending perpendicularly at or near the top edge and a second flange extending perpendicularly at or near the bottom edge;

the first and second flange each include a retaining hook formed therein at or near the second side edge of the at least one door, the retaining hook defining a curved slot complementary to a wall of the hinge pocket; and the curved slot is configured to receive the hinge pocket therein when the at least one door is in the closed position relative to the enclosure.

* * * * *